(12) United States Patent
Sukigara et al.

(10) Patent No.: US 7,303,344 B2
(45) Date of Patent: Dec. 4, 2007

(54) LABEL PRINTING APPARATUS

(75) Inventors: Motoyuki Sukigara, Tokyo (JP); Tatsuo Shiaku, Saitama (JP); Yuuki Yoshida, Saitama (JP); Junichi Mizukami, Saitama (JP)

(73) Assignee: TEAC Corporation, Tokyo (JP)

( * ) Notice: Subject to any disclaimer, the term of this patent is extended or adjusted under 35 U.S.C. 154(b) by 381 days.

(21) Appl. No.: 10/993,934

(22) Filed: Nov. 19, 2004

(65) Prior Publication Data

US 2005/0151825 A1  Jul. 14, 2005

(30) Foreign Application Priority Data

Nov. 21, 2003  (JP)  ............... 2003-392929

(51) Int. Cl.
*B41J 2/325*  (2006.01)
(52) U.S. Cl. ............... 400/120.13; 400/120.01; 400/691; 347/213
(58) Field of Classification Search ........... 400/120.13, 400/120.01, 120.16, 691; 347/213; 369/273
See application file for complete search history.

(56) References Cited

U.S. PATENT DOCUMENTS

| | | | |
|---|---|---|---|
| 6,019,151 A * | 2/2000 | Wen et al. .................. | 156/387 |
| 6,486,904 B1 * | 11/2002 | Onozato et al. ............ | 347/213 |
| 6,903,760 B2 * | 6/2005 | McFarland et al. ......... | 347/225 |
| 7,009,632 B2 * | 3/2006 | Sawyer ....................... | 347/224 |
| 7,226,225 B2 * | 6/2007 | Mochizuki et al. ...... | 400/120.01 |
| 2002/0122378 A1 * | 9/2002 | Kubo ........................ | 369/273 |

FOREIGN PATENT DOCUMENTS

| | | |
|---|---|---|
| JP | 05-238005 | 9/1993 |
| JP | 06-031906 | 2/1994 |
| JP | 2001-291235 | 10/2001 |
| JP | 2003-257153 | 9/2003 |

* cited by examiner

*Primary Examiner*—Leslie J. Evanisko
(74) *Attorney, Agent, or Firm*—Christensen O'Connor Johnson Kindness PLLC

(57) ABSTRACT

A thermal transfer-type label printer and an optical disc apparatus are integrated to miniaturize a multi-function label printing apparatus. An information recording/reproducing unit that carries out recording or reproduction of information on a recording surface of an optical disc is incorporated within a disc tray unit of a label printing apparatus that presses a thermal transfer film ribbon, on which printing information has been formed, onto a label surface of an optical disc mounted on a disc mounting part of the disc tray unit, and transfers the printing information onto the label surface using a heat roller. The recording or reproduction of information on the recording surface of the optical disc and the transferring of the printing information on the label surface of the optical disc are carried out on the disc tray unit. When transferring the printing information, the clamping of the optical disc by a disc clamper is released and a turntable and the disc clamper are withdrawn to a non-clamping position.

4 Claims, 19 Drawing Sheets

LABEL PRINTING APPARATUS

BACKGROUND OF THE INVENTION

1. Field of the Invention

The present invention relates to a label printing apparatus that records or reproduces information on an optical disc such as a CD (Compact Disc) or DVD (Digital Versatile Disc) and also prints information on a label surface of the optical disc.

2. Description of the Related Art

In recent years, the spread of optical discs such as CD-R/RW and DVD-R/RW/RAM has been accompanied with increasing demand for a label printer that can print images and/or character information, which has been generated on a personal computer or the like, on the label surface (upper surface) of a user-made CD or DVD. Also, multi-function label printing apparatuses, where an optical disc apparatus that records information on an optical disc and the label printer mentioned above are combined and enclosed within a single housing, have also entered the market.

As shown in FIG. 1 to FIG. 3, in one example of a multi-function label printing apparatus, optical disc apparatuses 102, 103 that record information on a recording surface (the lower surface) of an optical disc, a label printer that prints information such as images and an index onto a label surface (the upper surface) of an optical disc, and a disc conveying mechanism 120 that conveys optical discs are internally provided within a housing 101. In addition, a power supply circuit 130 that supplies power to the optical disc apparatuses 102, 103, the label printer 104, and the disc conveying mechanism 120 and a control circuit 131 that controls the optical disc apparatuses 102, 103, the label printer 104, and the disc conveying mechanism 120 are provided inside the housing 101.

The optical disc apparatuses 102, 103 are composed of CD-R/RW drives or DVD-R/RW/RAM drives or the like that record information by irradiating the recording surface of an optical disc with laser light, and on front surfaces thereof include disc trays 105, 106 on which an optical disc is mounted. The disc trays 105, 106 are provided so as to slide between a changing position where discs are changed and a loading position where the recording of information is carried out.

The label printer 104 also has a disc tray 107 on which an optical disc is mounted. The disc tray 107 is provided so as to slide between a changing position where discs are changed and a printing position where the printing of information is carried out. The label printer 104 is constructed so as to be open to above when the disc tray 107 has moved to the printing position, with an ink cartridge 108 moving in a left-right direction above the disc tray 107. Ink is sprayed from a head 110 of the ink cartridge 108 that moves in a left-right direction along a traveling rail 109 suspended above and across the disc tray 107 onto the label surface of the optical disc to print desired information. It should be noted that in the label printer 104, the sliding stop position of the disc tray 107 is moved in small steps so that printing can be carried out in the entire region of the label surface of an optical disc.

The disc conveying mechanism 120 includes a guide rail 121 that is suspended between a first disc storage part 111 where unrecorded optical discs are stored and a second disc storage part 112 where recorded optical discs are stored, a grabbing part 122 that moves horizontally in the left-right direction along the guide rail 121, and a clamper 123 that is supported on the grabbing part 122. The grabbing part 122 has a raising/lowering mechanism 124 with a pantograph construction in which first and second arms composed of a pair of parallel links are combined, and is constructed so as to raise and lower the clamper 123 and to insert the clamper 123 into a center hole of an optical disc to clamp the optical disc. With the disc conveying mechanism 120 of this construction, an optical disc is conveyed between the first disc storage part 111, the optical disc apparatuses 102, 103, the label printer 104, and the second disc storage part 112.

The multi-function label printing apparatus 100 is a recording/printing apparatus that automatically carries out a recording process that records information to be stored on an optical disc according to instructions from a host computer (not shown), a printing process that prints information such as images and an index on the label surface of the optical disc, and a disc conveying process that conveys discs between the first disc storage part 111 and the second disc storage part 112, so that compared to a system in which an optical disc apparatus and a label printer that are separately constructed are respectively connected to a host computer, there are the effects that the burden of manually changing discs is eliminated and the operating efficiency is increased. However, although optical disc apparatuses and a label printer are enclosed within the same housing in the multi-function label printing apparatus 100, the optical disc apparatuses and label printer are separate devices, so that there is the problem that the multi-function label printing apparatus is large. There is also the problem that the optical disc changing process is complex, which leads to increases in cost.

To solve the above problems, information recording apparatuses for optical discs have been proposed (see, for example, Patent Documents 1 to 4) where an optical disc apparatus and a label printer are integrated and the recording of information on the recording surface and the printing of information on the label surface can be carried out on a shared turntable.

Patent Documents 1 and 2 mentioned above disclose a label printing apparatus for discs and an information recording apparatus for optical discs including a spindle motor that rotates an optical disc at a predetermined speed, a pickup that records recording information and is disposed facing the recording surface of the optical disc, and an ink jet apparatus that is disposed facing the label surface of the optical disc and prints printing information, where recording information is recorded and printing information is printed while an optical disc is rotated at a predetermined speed.

Patent Document 3 mentioned above discloses an optical disc drive apparatus internally equipped with a label printer. The apparatus includes a spindle motor that holds and axially rotates an optical disc, a data head that is provided facing a data recording surface and records and reproduces data on the optical disc, a data head driving mechanism that moves the data head back and forth in the radial direction of the optical disc, a label printing head that is provided so as to face the label surface, and a printing head driving mechanism that moves the label printing head back and forth in the radial direction of the optical disc. The apparatus records data on the data recording surface and simultaneously prints a label on the label surface in synchronization with the rotation of the optical disc.

Patent Document 4 mentioned above discloses a recording apparatus including a rotation tray unit on which a disc medium, which is a rotating recording medium, is placed, a rotation tray control unit that controls the tray, a writing means (optical pickup) that writes data on the disc medium, and a recording means (recording head) that records on a disc medium surface (the label surface). The recording apparatus carries out the writing of data and the recording of the disc label in synchronization with the rotation of the disc medium.

[Patent Document 1]
Japanese Laid-Open Patent Application No. H05-238005

[Patent Document 2]
Japanese Laid-Open Patent Application No. H06-31906

[Patent Document 3]
Japanese Laid-Open Patent Application No. 2001-291235

[Patent Document 4]
Japanese Laid-Open Patent Application No. 2003-257153

The apparatuses disclosed by Patent Documents 1 to 4 listed above are alike in that an optical disc is placed on a turntable and the recording of information and the printing of the label surface are carried out while rotating the optical disc and in that the label printer uses an ink jet printing method. Label printers can be broadly classified into two types, ink jet types and thermal transfer types. Ink jet printing is a method where printing is carried out by spraying ink onto the label surface of an optical disc using a head, while thermal transfer printing is a method where printing information formed on a transfer sheet is pressed and transferred onto the label surface of an optical disc by a heat roller, and it is thought that the label printers incorporated in the apparatuses of Patent Documents 1 to 4 above all carry out ink jet printing for a particular reason. That is, during ink jet printing, the head that sprays ink does not contact the label surface of the optical disc. During thermal transfer printing, a heat roller is pressed onto the label surface of an optical disc via a transfer sheet, and if the heat roller is pressed on the optical disc in a state where the optical disc is placed on a turntable, that is, in a state where the optical disc has been lifted up from the disc tray, the optical disc will warp, so that it will not be able to transfer the printing information and there is even the risk of the optical disc becoming damaged. On the other hand, with ink jet printing, the head does not contact the optical disc, so that printing information can be easily printed even when the optical disc is attached to a turntable, which means that an ink jet printer is suited to integration with an optical disc apparatus.

However, ink jet printers print by spraying ink onto the label surface of an optical disc, so that if the optical disc is rotated before the sprayed ink has dried, due to centrifugal force the ink on the optical disc can disperse towards the outer periphery of the optical disc or become blurred, so that there is the problem of poor image quality for the printed image. In addition, with apparatuses such as those disclosed in Patent Documents 1 to 4 where the optical disc is rotated and printing is carried out in synchronization with the rotation of the optical disc, there is the problem that ink sprayed from the head is dispersed by wind pressure produced between the label surface of the optical disc and the head, which lowers the quality of the printed image and means that the desired printing information cannot be printed properly. Thermal transfer-type label printers have a further advantage in that it is possible to print the printing information more clearly and more stably than an ink jet-type label printer, and it would be desirable to put this advantage to use.

SUMMARY OF THE INVENTION

The present invention was conceived in view of the above problems with the related art, and provides a label printing apparatus where an information recording/reproduction unit that carries out recording or reproduction of information on a recording surface of an optical disc is incorporated within a disc tray of a thermal transfer-type label printer.

The present invention solves the problems described above by way of the various apparatuses described below. That is, a first aspect of the present invention is a label printing apparatus that presses a transfer sheet on which printed information has been formed onto a label surface of an optical disc mounted on a disc tray to transfer the printed information onto the label surface, the label printing apparatus internally including, in the disc tray, an information recording/reproduction unit for recording or reproducing information on a recording surface of the optical disc.

With the first aspect of the present invention, by internally including, in a disc tray provided in a thermal transfer-type label printer, an information recording/reproduction unit for recording or reproducing information on a recording surface of the optical disc, it becomes possible to additionally use the disc tray as an optical disc apparatus so that it is not necessary to separately provide a dedicated optical disc apparatus for recording and reproducing information on a recording surface of the optical disc and a dedicated label printer for printing information on the label surface of the optical disc and therefore the label printing apparatus can be miniaturized. Also, since a thermal transfer-type device is used as the label printer, printing information can be clearly printed on the label surface of an optical disc without ink dispersing or smudging, so that clear printing information can be printed onto the label surface of the optical disc.

According to a second aspect of the invention, the information recording/reproduction unit in the label printing apparatus of the first aspect may include: an optical head unit for recording or reproducing information by emitting a light beam onto the recording surface of the optical disc; a supporting unit for rotatably supporting the optical disc; and a rotating unit for rotating the optical disc at a predetermined speed, wherein when the printing information is printed on the label surface of the optical disc, a supporting of the optical disc by the supporting unit is released.

With the second aspect of the present invention, the clamping of an optical disc by a supporting unit is released when the printing information is printed on the label surface of the optical disc and the recording surface of the optical disc contacts the disc tray, so that when the printing information is printed on the label surface of the optical disc, an appropriate pressure can be applied to the label surface of the optical disc without obstructing the movement of a heat roller that presses a transfer sheet onto the label surface.

According to a third aspect of the invention, the information recording/reproduction unit in the label printing apparatus of the second aspect may further include a holding unit that statically holds the optical disc on the disc tray, wherein the optical disc is held by the holding unit when the supporting of the optical disc by the supporting unit has been released.

With the third aspect of the present invention, a holding unit, such as a grip sheet or vacuum mechanism, that statically holds the optical disc is provided on the surface of the disc tray, so that when the supporting of the optical disc by the supporting unit is released and the recording surface of the optical disc contacts the disc tray, the optical disc can be held on the disc tray without moving, and when the printing information is printed on the label surface of the optical disc, it is possible to prevent the printed image from becoming displaced on the label surface of the optical disc.

According to a fourth aspect of the invention, in the label printing apparatus of the second or third aspect, the supporting unit may be movable between a supporting position where the supporting unit rotatably supports the optical disc and a non-supporting position where the supporting of the optical disc is released, and the supporting unit is moved to the non-supporting position when the disk tray is moved from a position where the printing information can be printed on the label surface of the optical disc to a position where the optical disc can be changed.

With the fourth aspect of the present invention, when the disk tray is moved from a position ("loading position") where the printing information can be printed on the label surface of the optical disc to a position where the optical disc can be changed ("unloading position"), the support unit is moved to the non-supporting position, so that when the disc tray moves to the position where the optical disc can be changed, the clamping of the optical disc will always be released and the center hole of the optical disc will be freed, so that it is possible to have the optical disc automatically changed. In addition, from position information on the disc tray and position information on the supporting unit, it is possible to determine the state of the optical disc on the disc tray.

According to a fifth aspect of the invention, in the label printing apparatus of the fourth aspect, when the disc tray is at the position where the optical disc can be changed and it has been confirmed that an optical disc is not mounted on the disc tray, the supporting unit may move from the non-supporting position to the supporting position.

With the fifth aspect of the present invention, when the disc tray is at the position where the optical disc can be changed and it has been confirmed that an optical disc is not mounted on the disc tray, the supporting unit moves from the non-supporting position for an optical disc to the supporting position, so that it is possible to reliably clamp the optical disc by pressing the optical disc with a disc conveying mechanism, even when a ball clamper is used as the supporting unit. Additionally, it is possible to determine the state of the optical disc on the disc tray from position information on the disc tray and position information on the supporting unit.

A label printing apparatus presses a transfer sheet on which printed information has been formed onto a label surface of an optical disc mounted on a disc tray to transfer the printed information onto the label surface, the label printing apparatus internally including, in the disc tray, an information recording/reproduction unit for recording or reproducing information on a recording surface of the optical disc. When printing information is printed on the label surface of an optical disc together with recording or reproduction of information on a recording surface of the optical disc by the information recording/reproduction unit, the supporting (clamping) of the optical disc by the supporting unit that rotatably supports the optical disc is released and the optical disc is statically held on the disc tray. As the supporting unit, it is preferable to use a ball clamper that supports the optical disc by pressing the center hole of the optical disc in a radial direction.

DESCRIPTION OF THE PREFERRED EMBODIMENTS

An embodiment of the present invention will now be described with reference to FIG. 4 to FIG. 19.

Figure 1:
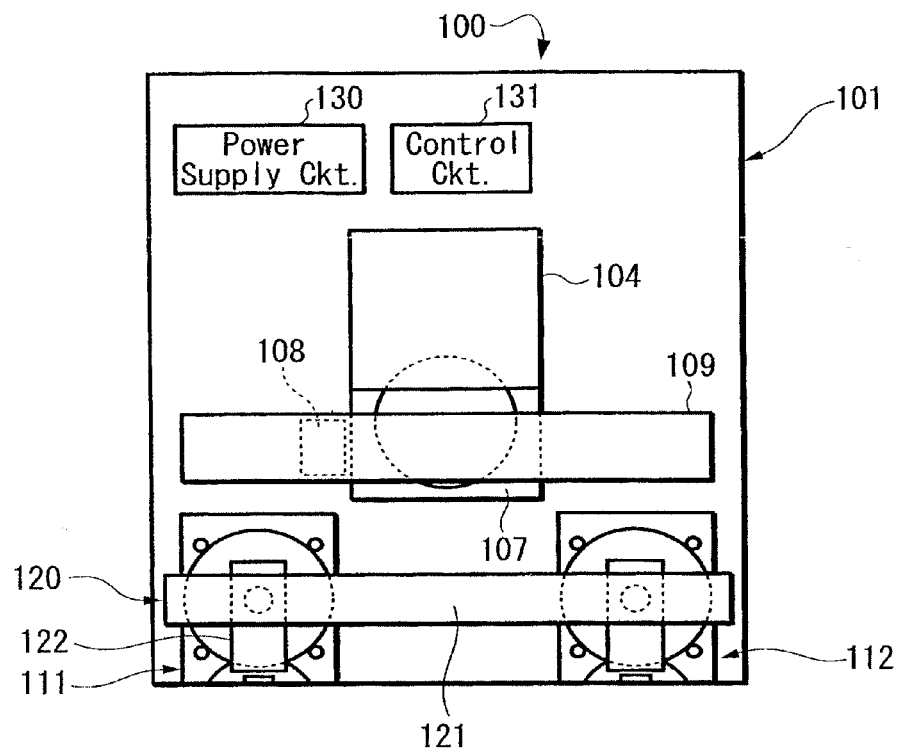
FIG. 1 is a plan view of a conventional multi-function label printing apparatus.
Figure 2:
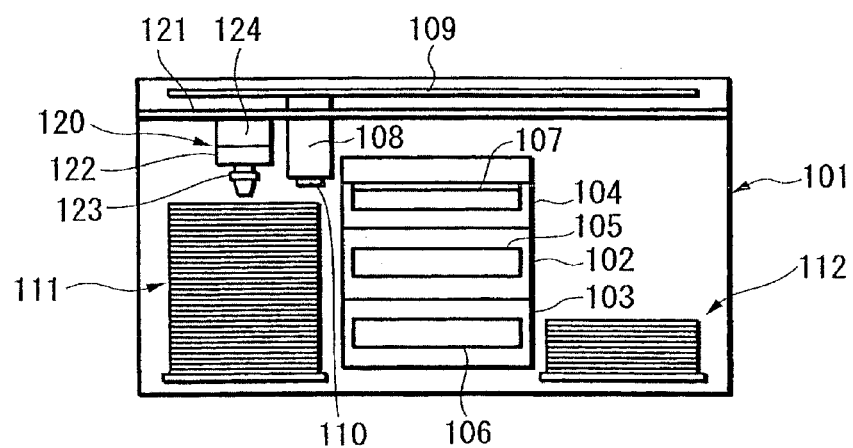
FIG. 2 is a front elevation of the conventional multi-function label printing apparatus.
Figure 3:
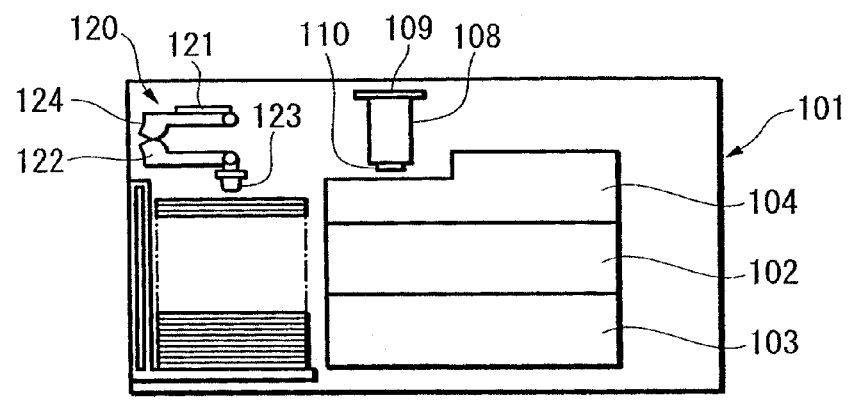
FIG. 3 is a side elevation of the conventional multi-function label printing apparatus.
Figure 4:
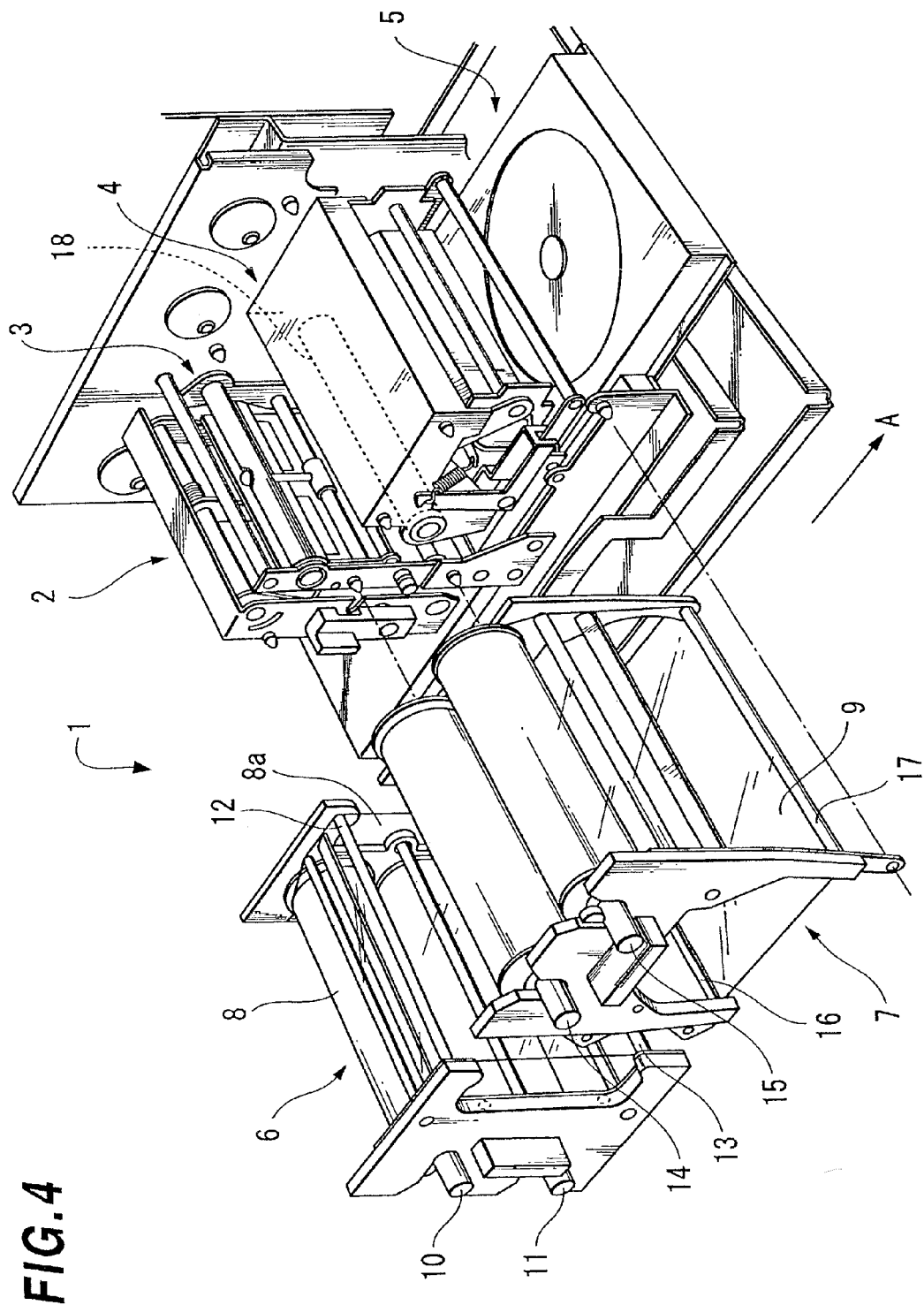
FIG. 4 is a perspective view showing the construction of principal parts of a label printer.
Figure 5:
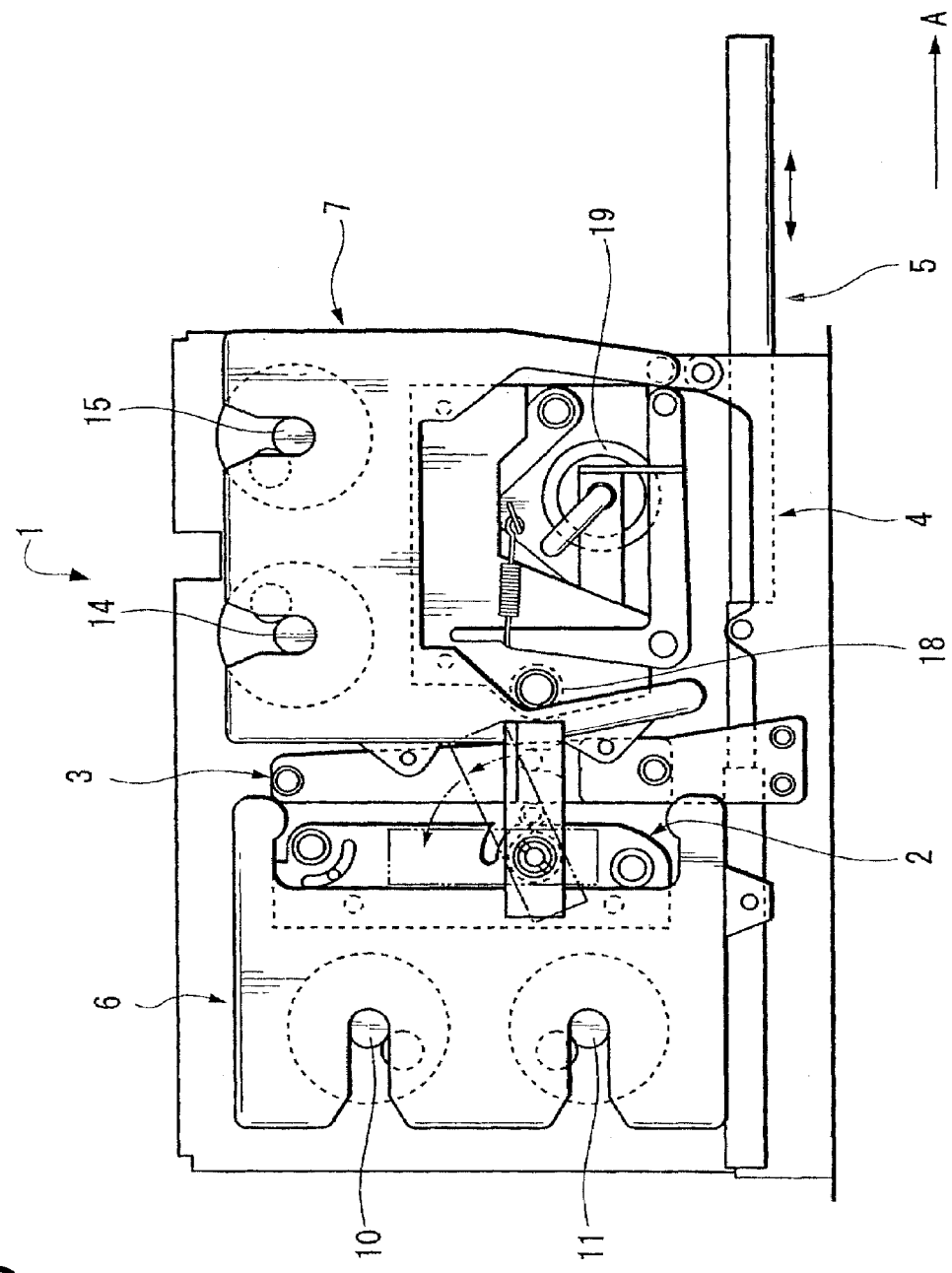
FIG. 5 is a side elevation showing the construction of the principal parts of the label printer.

FIG. 4 and FIG. 5 are schematic diagrams showing a label printer according to the present invention. FIG. 4 is a perspective view of the label printer, and FIG. 5 is a side elevation. The label printer 1 is broadly divided into a head unit 2, a guide unit 3, a transfer roller unit 4, a disc conveying unit 5, an ink ribbon cassette 6, and a thermal transfer film ribbon cassette 7. The ink ribbon cassette 6 and the thermal transfer film ribbon cassette 7 can be attached to and detached from the label printer 1 from the side, with the ink ribbon cassette 6 being set on the label printer 1 so that a printing surface 8a of an ink ribbon 8 is positioned between the head unit 2 and the guide unit 3 and the thermal transfer film ribbon cassette 7 being set so that a thermal transfer film ribbon 9 used as a transfer sheet is wound around the transfer roller unit 4.

The ink ribbon cassette 6 includes a feeding roller 10 and a winding roller 11, with the ink ribbon 8 being wound between the feeding roller 10 and the winding roller 11 via guide rollers 12 and 13. Black, cyan, magenta, and yellow inks are applied repeatedly in that order to the ink ribbon 8.

The thermal transfer film ribbon cassette 7 includes a feeding roller 14 and a winding roller 15, with the thermal transfer film ribbon 9 being wound between the feeding roller 14 and the winding roller 15 via guide rollers 16 and 17.

The head unit 2 includes a thermal print head (not shown) for transferring the respective inks applied to the ink ribbon 8 onto the thermal transfer film ribbon 9. The thermal print head is moved in a direction A in FIG. 4 in a space provided in the guide unit 3 and so is brought into contact with a platen roller 18 of the transfer roller unit 4. At this time, since the ink ribbon 8 and the thermal transfer film ribbon 9 are held between the thermal print head and the platen roller 18, the ink ribbon 8 and the thermal transfer film ribbon 9 are moved simultaneously and the thermal print head is controlled so that an image is transferred onto the thermal transfer film ribbon 9. Since the color image transferred onto the thermal transfer film is produced by superimposing the respective inks, the transfer operation is repeated four times for one color image.

The guide unit 3 is for winding the ink ribbon 8 and the thermal transfer film ribbon 9 onto the platen roller 18 in an "M" shape, and while moving a pair of pinch rollers (not shown) in the direction A in FIG. 4 to guide the ink ribbon 8 and the thermal transfer film ribbon 9, the guide unit 3 winds the ink ribbon 8 and the thermal transfer film ribbon 9 around the platen roller 18.

The transfer roller unit 4 includes the above platen roller 18 and a heat roller 19, with the heat roller 19 being supported so that the heat roller 19 can be raised and lowered. The image transferred onto the thermal transfer film ribbon 9 by the thermal head printer is moved to a transfer position below the heat roller 19 for transfer onto an optical disc mounted on a disc tray unit, described later, of the disc conveying unit 5. The disc tray unit on which the optical disc is mounted is pulled into the printer, and when the disc tray unit is moved in the eject direction (the direction A in FIG. 4), the heat roller 19 is lowered and presses the thermal transfer film ribbon 9 onto the optical disc on the disc tray unit. In accordance with the movement of the disc tray unit, the image produced on the thermal transfer film ribbon 9 is transferred onto the optical disc.

The construction of the disc conveying unit 5 according to the present invention will now be described in detail.

The disc conveying unit 5 is mainly constructed of a disc tray unit 50 and a disc tray unit conveying mechanism.

Figure 6:
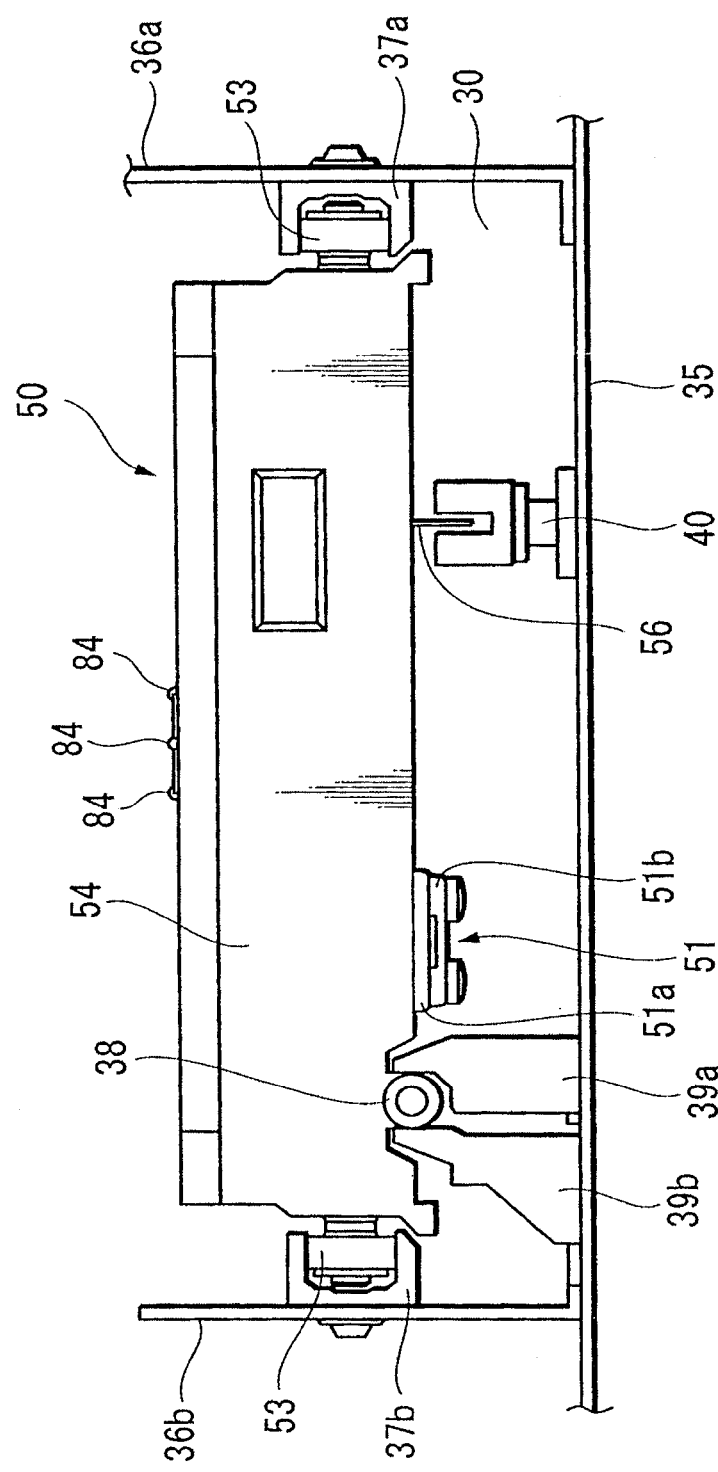
FIG. 6 is a front elevation showing the construction of principal parts of a disc tray unit conveying mechanism.
Figure 7:
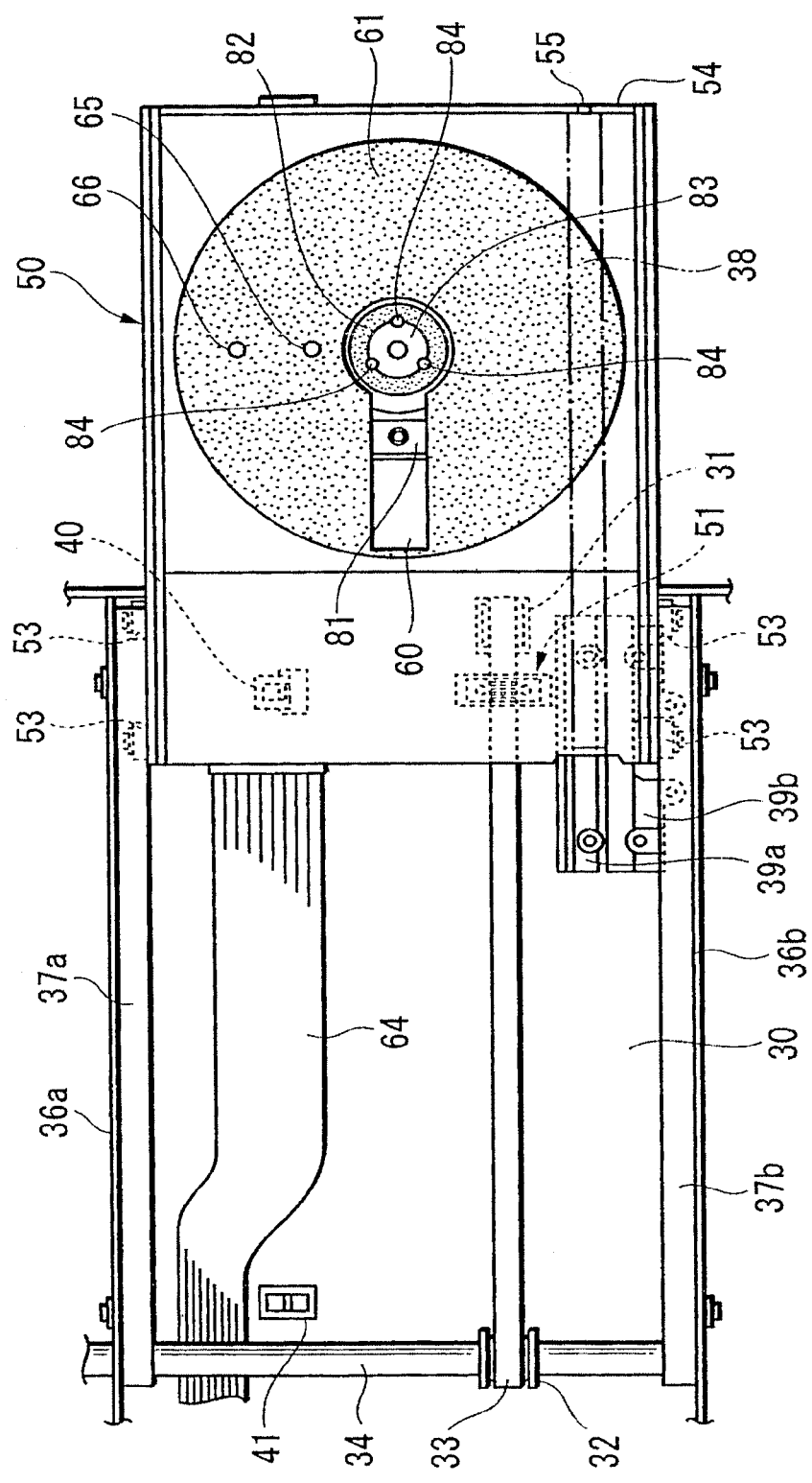
FIG. 7 is a top view showing the construction of the principal parts of a disc tray unit conveying mechanism.
Figure 8:
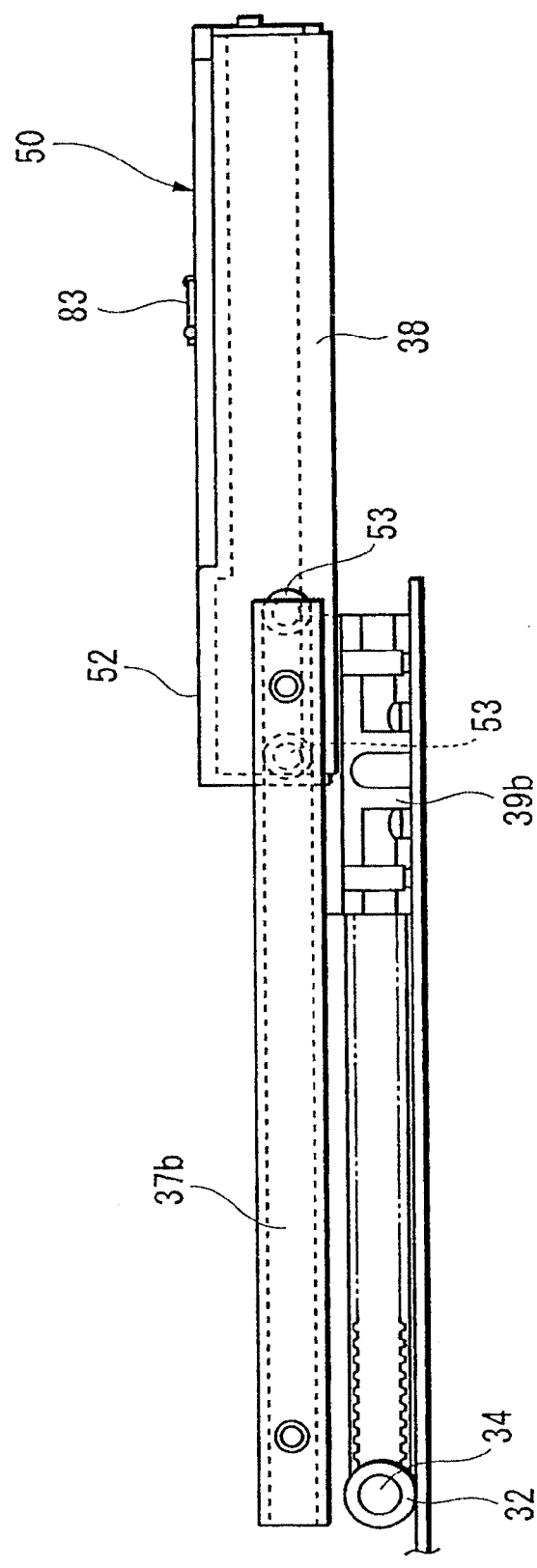
FIG. 8 is a side elevation showing the construction of the principal parts of the disc tray unit conveying mechanism.

The display unit conveying mechanism will be described first in detail. FIG. 6 to FIG. 8 show the principal parts of the construction of the display unit conveying mechanism, with FIG. 6 being a front elevation, FIG. 7 being a top view, and FIG. 8 being a side elevation.

The disc tray unit 50 is moved back and forth by a driving mechanism provided on the label printer main body that encloses the disc tray unit 50.

In the present embodiment, the disc tray unit 50 is constructed so as to be moved by a belt drive. Moving the disc tray unit using a belt drive has a characteristic in that compared to when the disc tray unit is moved using a rack and pinion, vibration components are less easily transmitted to the disc tray unit, which is suitable for a driving mechanism used in an apparatus, such as the disc tray unit used in a label printer, where the suppression of vibration components is important.

Wheels 31, 32 are disposed at the front end part and back end part of a disc tray unit enclosure 30, and a timing belt 33 is suspended between the two wheels 31, 32. The wheel 32 is axially supported on a drive shaft 34 and by rotating the wheel 32 together with the drive shaft 34 using a drive motor (not shown), a driving force is transmitted to the timing belt 33. A timing belt engaging part 51 is provided on the lower surface of the disc tray unit 50, and by holding and fixing a predetermined position of the timing belt 33 using a fixing member 51b whose contact surfaces for a base 51a formed on a frame main body 52 and for a timing belt 33 are subjected to an antislip treatment, the disc tray unit 50 is moved in accordance with the driving of the timing belt 33.

Four guide rollers 53 are axially supported at the back of the side surfaces of the disc tray unit 50. By engaging U-shaped guide rails 37a, 37b that are screwed to inner surfaces of subchassis 36a, 36b erected on a chassis 35 of the disc tray unit enclosure 30, the guide rollers 53 guide the movement of the disc tray unit 50. In addition, a guide shaft 38 is provided so as to span the disc tray unit 50 in the movement direction on one side of a base surface of the disc tray unit 50. By engaging a pair of guiding members 39a, 39b disposed on one side in a front part of the disc tray unit enclosure 30, the guide shaft 38 guides the movement of the disc tray unit 50. It should be noted that both end parts of the guide shaft 38 are formed so as to be convex, with one of the convex ends being fitted into an engaging hole 55 formed in a side surface 54 of the frame main body of the disc tray unit 50 and the other convex end being inserted into an engaging hole formed in a guide shaft fixing member (not shown) fixed on the frame main body 52, thereby fixing the guide shaft 38 to the frame main body 52.

An eject sensor 40 and a loading sensor 41 are respectively disposed at positions substantially corresponding to the wheel 31 and the wheel 32 at the front end and back end of the disc tray unit enclosure 30, and by detecting a detection member 56 erected on the disc tray unit 50, the range of movement of the disc tray unit 50 is defined.

Next, the disc tray unit will be described in detail with reference to FIG. 9 and FIG. 10.

Figure 9:
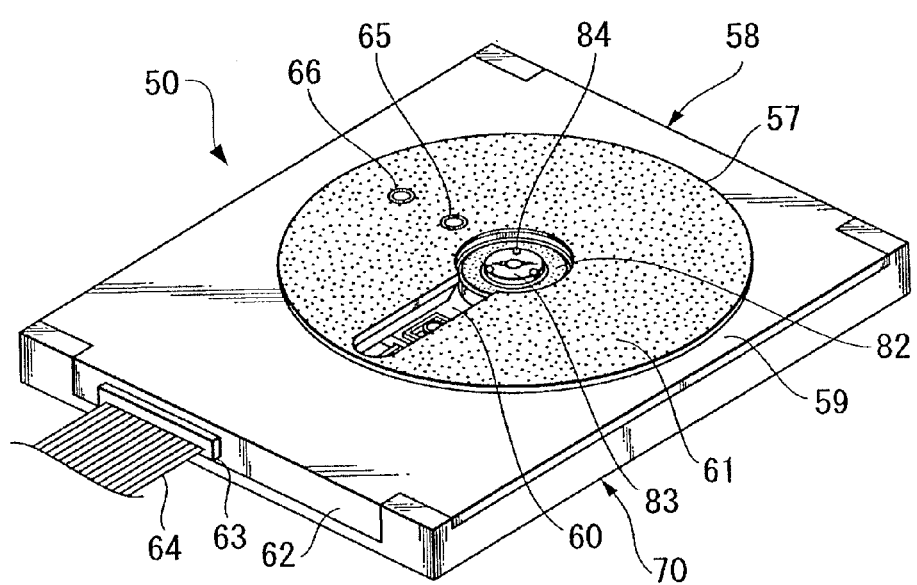
FIG. 9 is an external view showing principal parts of the disc tray unit.
Figure 10:
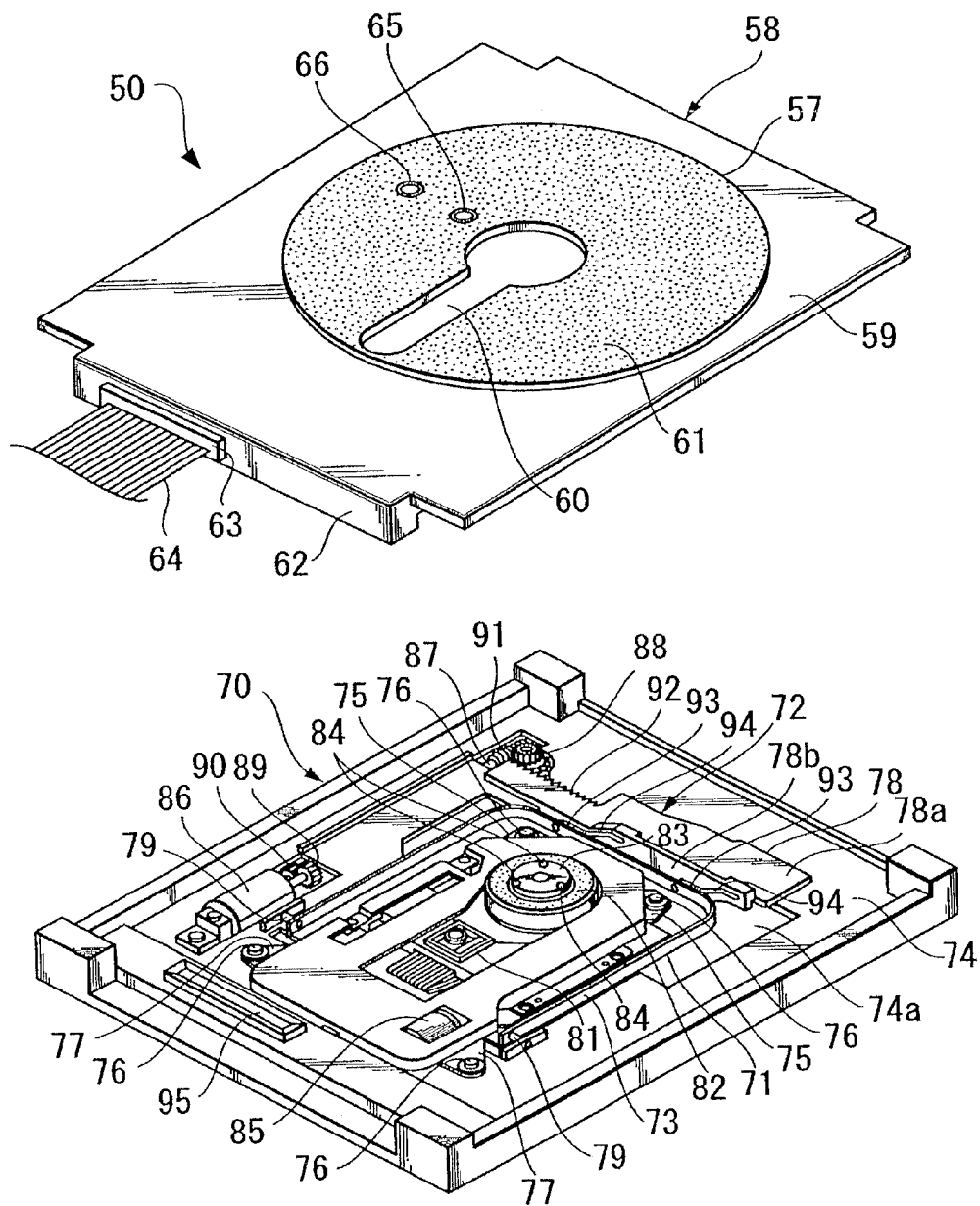
FIG. 10 is a perspective view showing the construction of the principal parts of the disc tray unit.

As shown in FIG. 9 and FIG. 10, the disc tray unit 50 is constructed of the frame main body 52, a disc tray 58 in whose upper surface a disc mounting part 57 is formed, and an information recording/reproducing unit 70 that records or reproduces information on a recording surface of an optical disc.

The disc mounting part 57, which is concave-shaped for mounting an optical disc, is formed in a surface 59 of the disc tray 58, and a hole 60 is formed in a range of movement of a head unit from a substantially central part of the disc mounting part 57 where a turntable 82 and a disc clamper 83 for rotatably supporting the optical disc are positioned. A grip sheet 61 that has been surface-treated to hold an optical disc that has been mounted by suction without the optical disc moving is stuck onto the surface of the disc mounting part 57. The depth of the disc mounting part 57 with respect to the surface 59 of the disc tray 58 is set so that when an optical disc has been mounted on the grip sheet 61, the surface of the optical disc is substantially flush with the surface 59 of the disc tray 58. It should be noted that the grip sheet 61 does not need to have a sucking action so long as a surface treatment that increases the friction coefficient with respect to the recording surface of the optical disc is carried out.

Detection holes 65, 66 for detecting whether an optical disc is present on the disc mounting part 57 are formed in the surface of the disc mounting part 57, and photointerruptors (not shown) are disposed inside the disc tray unit 50 at positions corresponding to the detection holes 65, 66. The detection hole 65 is used to detect a single CD (8 cm CD) or a card-shaped CD.

An interface connector 63 for electrically connecting the disc tray unit 50 to the label printer main body is disposed on a back end surface 62 of the disc tray 58, with the disc tray unit 50 and the label printer main body being connected via a cable 64 connected to the interface connector 63. The interface connector 63 is connected to a control circuit board (not shown) that controls the information recording/reproducing unit 70 and is provided on a rear surface of the disc tray 58. The control circuit board is connected to the information recording/reproducing unit 70 via a connector 95 provided towards the back of the information recording/reproducing unit 70. It should be noted that the control circuit board may be disposed in the information recording/reproducing unit 70 and the cable 64 may be connected to the information recording/reproducing unit 70.

The information recording/reproducing unit 70 is composed of a pickup base 71 and a disc clamping mechanism 72.

As shown in FIG. 10, the pickup base 71 has a floating construction where the pickup base 71 is disposed together with a raising/lowering base 73 of the disc clamping mechanism 72 in an opening 74a of a main stage 74, with holding arms 75 formed at two positions at the front end part of the pickup base 71 being screwed to the raising/lowering base 73 via insulators 76 and holding arms 77 formed at two positions at the back end part being screwed to the main stage 74 via insulators 76. The raising/lowering base 73 is supported so as to be able to swing in a cantilevered state together with the pickup base 71, and a front end part thereof is supported so that the front part can be raised and lowered about a spindle 79 by a slide plate 78 of the disc clamping mechanism 72. A spindle motor 80 is fixed to the pickup base 71, and a head unit 81 that is principally an optical pickup is disposed near the spindle motor 80.

The turntable 82 is fixed to the drive shaft of the spindle motor 80, and the disc clamper 83 is fixed onto the turntable 82. The disc clamper 83 is composed of a ball clamper composed of a plurality of spherical members 84 that are energized in the centrifugal direction from the drive shaft of the spindle motor 80. When the pickup base 71 has been raised and is at a supporting position (hereinafter the "clamping position") where a supporting means made up of the turntable 82 and the disc clamper 83 rotatably supports an optical disc, the disc clamper 83 presses and supports the center hole of the optical disc mounted on the turntable 82 in the centrifugal direction so that the rotational force of the spindle motor 80 is transmitted to the optical disc. Also, when the supporting means moves from the clamping position to a non-supporting position (hereinafter called the "non-clamping position") where the supporting of the optical disc is released, the supported optical disc is pressed onto the surface of the disc mounting part 57 so as to restrict the movement of the optical disc, so that as the supporting means moves, the optical disc is automatically separated from the supporting means, and the supporting of the optical disc is thereby released. On the other hand, the head unit 81 can move while guided by two guide shafts (not shown) that extend in the radial direction about the spindle motor 80 and by moving the head unit 81 using a lead groove of a screw shaft (not shown) driven by a feed motor 85, the recording or reproduction of information on the optical disc is carried out.

The disc clamping mechanism 72 is composed of a driving mechanism composed of a drive motor 86, a shaft 87, and a drive gear 88 that are disposed in parallel with the pickup base 71 on the main stage 74, and the raising/lowering base 73 and the slide plate 78 that are disposed on the main stage 74 towards the front of the information recording/reproducing unit 70. A motor gear 89 is fixed to a rotation shaft of the drive motor 86, a transmission gear 90 that engages the motor gear 89 is fixed to one end of the shaft 87 and a worm gear 91 is fixed to the other end. The worm gear 91 engages the drive gear 88 disposed on the surface side of the main stage and the drive gear 88 engages a rack gear 92 formed on the slide plate 78. The drive motor 86 is disposed on a back side of the information recording/reproducing unit 70 so as to make the information recording/reproducing unit 70 slimmer and the driving force of the drive motor 86 is transmitted to the front of the information recording/reproducing unit 70 via the motor gear 89, the transmission gear 90, the shaft 87, and the worm gear 91 and is transmitted via the drive gear 88 to the slide plate 78.

The raising/lowering base 73 is supported so as to swing about the spindle 79 in a cantilevered state together with the pickup base 71 as mentioned above, and two support pins 93 are provided at the front end thereof. The slide plate 78 is a "V" shaped plate composed of a horizontal surface 78a and a vertical surface 78b, and is supported on the main stage 74 so as to be able to slide in a direction perpendicular to the movement direction of the disc tray unit 50. The rack gear 92 that engages the drive gear 88 is formed at one end of the horizontal surface 78a of the slide plate 78 and two raising/lowering guide channels 94 that respectively engage the two support pins 93 provided on the raising/lowering base 73 are formed in the vertical surface 78b. The slide plate 78 slides via the drive gear 88 and the rack gear 92 when the drive motor 86 is driven, and as the slide plate 78 slides, the support pins 93 of the raising/lowering base 73 are guided by the raising/lowering guide channels 94 formed in the vertical surface 78b of the slide plate 78 so that the pickup base 71 is raised and lowered.

Figure 16:
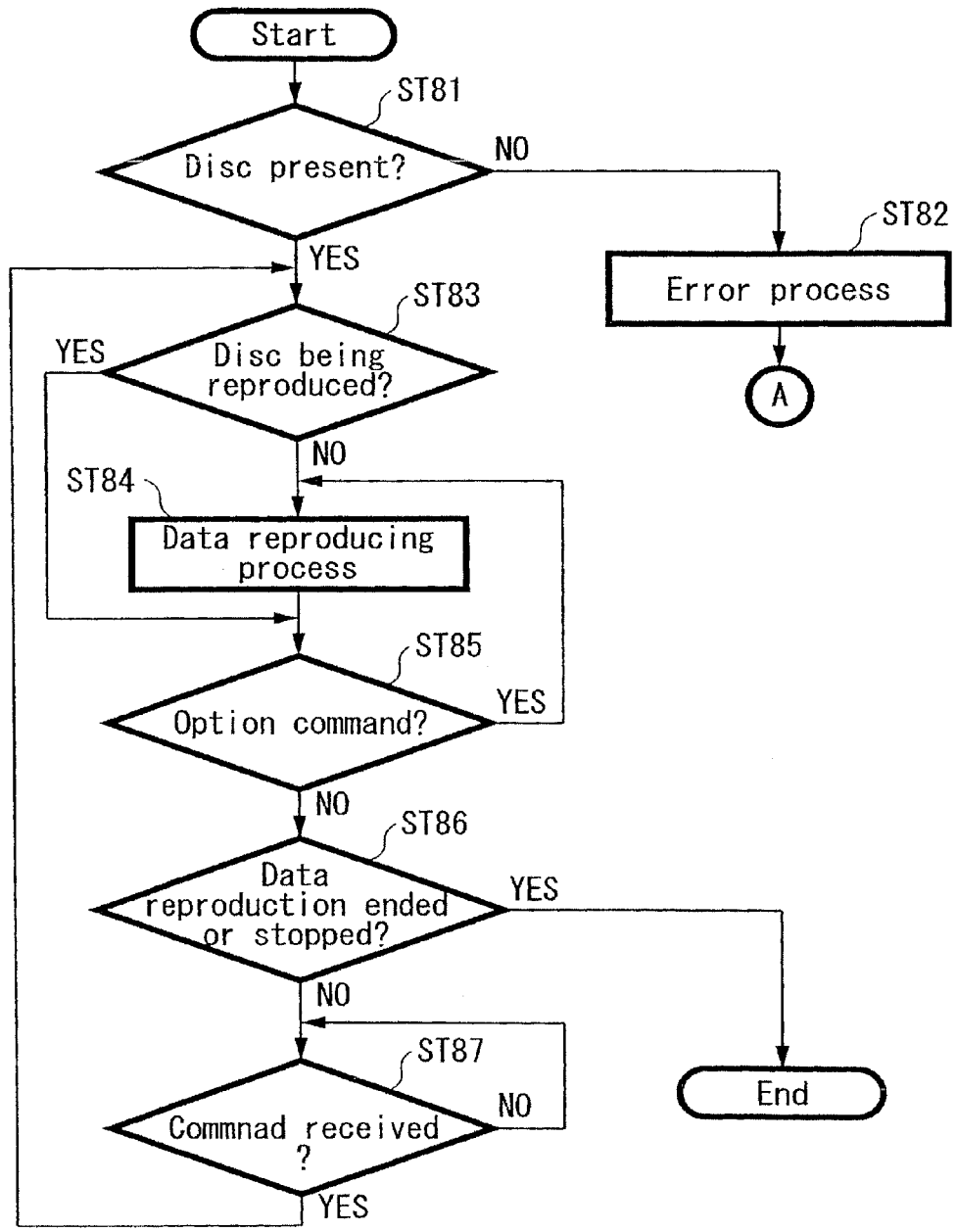
FIG. 16 is a control flowchart useful in explaining a data reproducing process in the core process operation.
Figure 17:
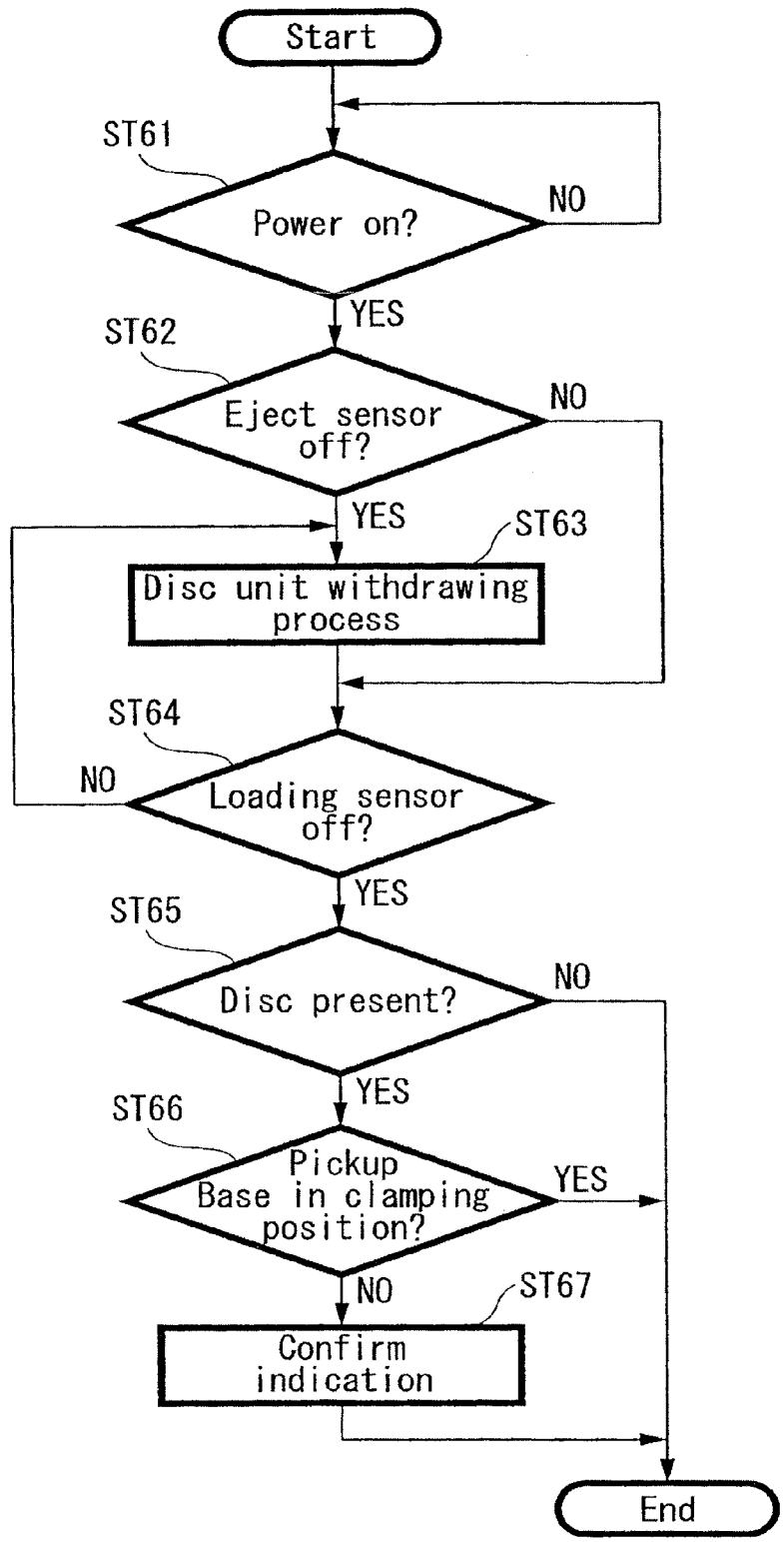
FIG. 17 is a control flowchart useful in explaining the process of an initialization operation of the disc tray unit in a single-type label printing apparatus.
Figure 18:
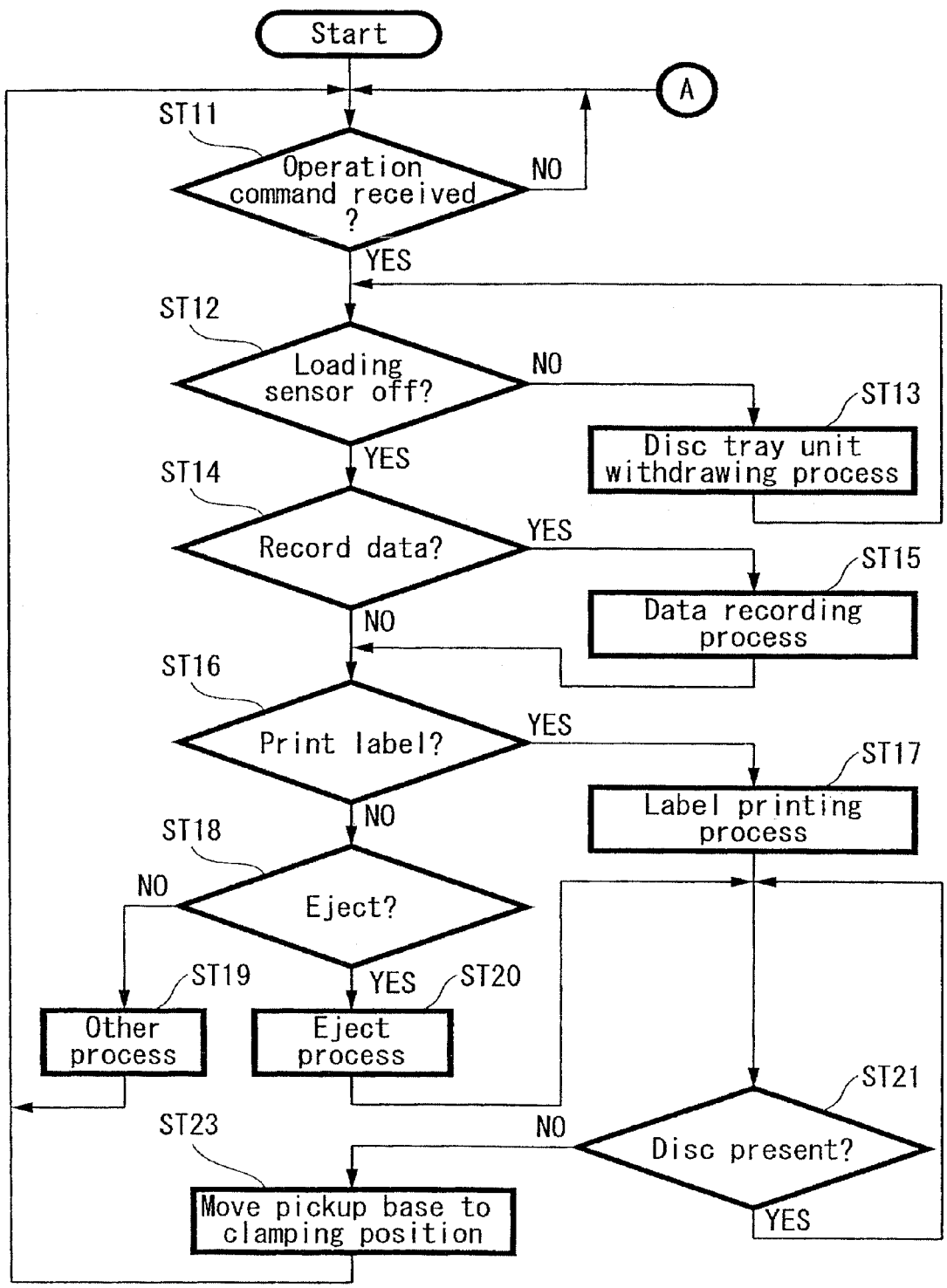
FIG. 18 is a control flowchart useful in explaining the core process operation of a disc tray unit in a single-type label printing apparatus.
Figure 19:
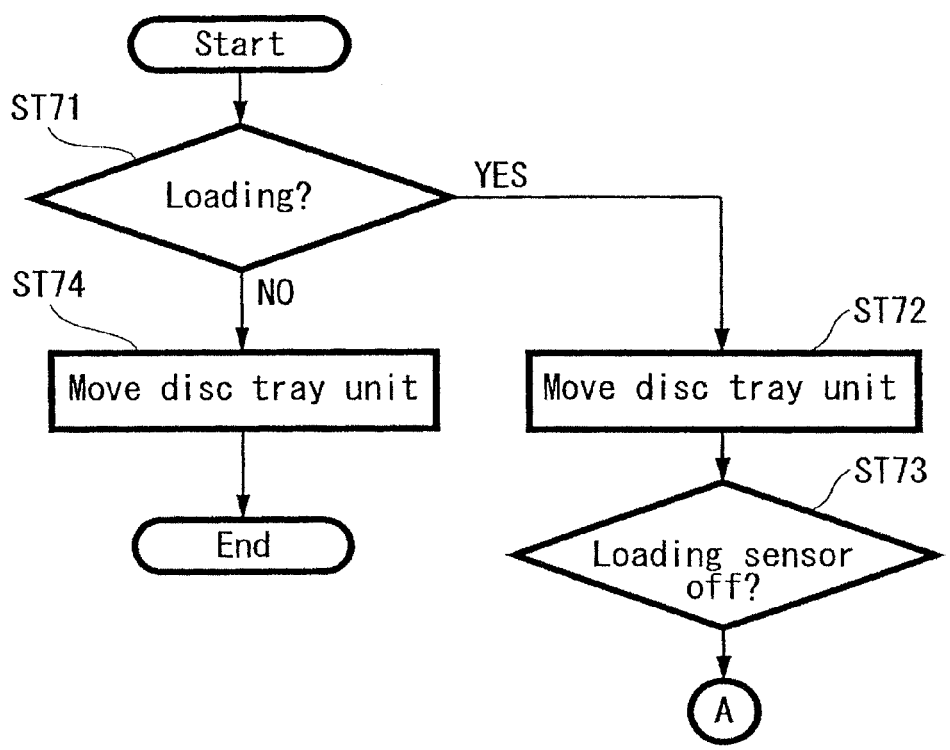
FIG. 19 is a control flowchart useful in explaining a withdrawing process in the core process operation shown in FIG. 18.

A detailed example construction of a label printing apparatus according to the present invention has been described above, and an example operation of the disc tray unit in the above label printing apparatus will now be described with reference to FIG. 11 to FIG. 20. It should be noted that FIG. 11 to FIG. 15 are control flowcharts for automating the changing of discs, FIG. 16 is a control flowchart of a reproducing process for an optical disc, and FIG. 17 to FIG. 19 are control flowcharts for manually changing discs.

Figure 11:
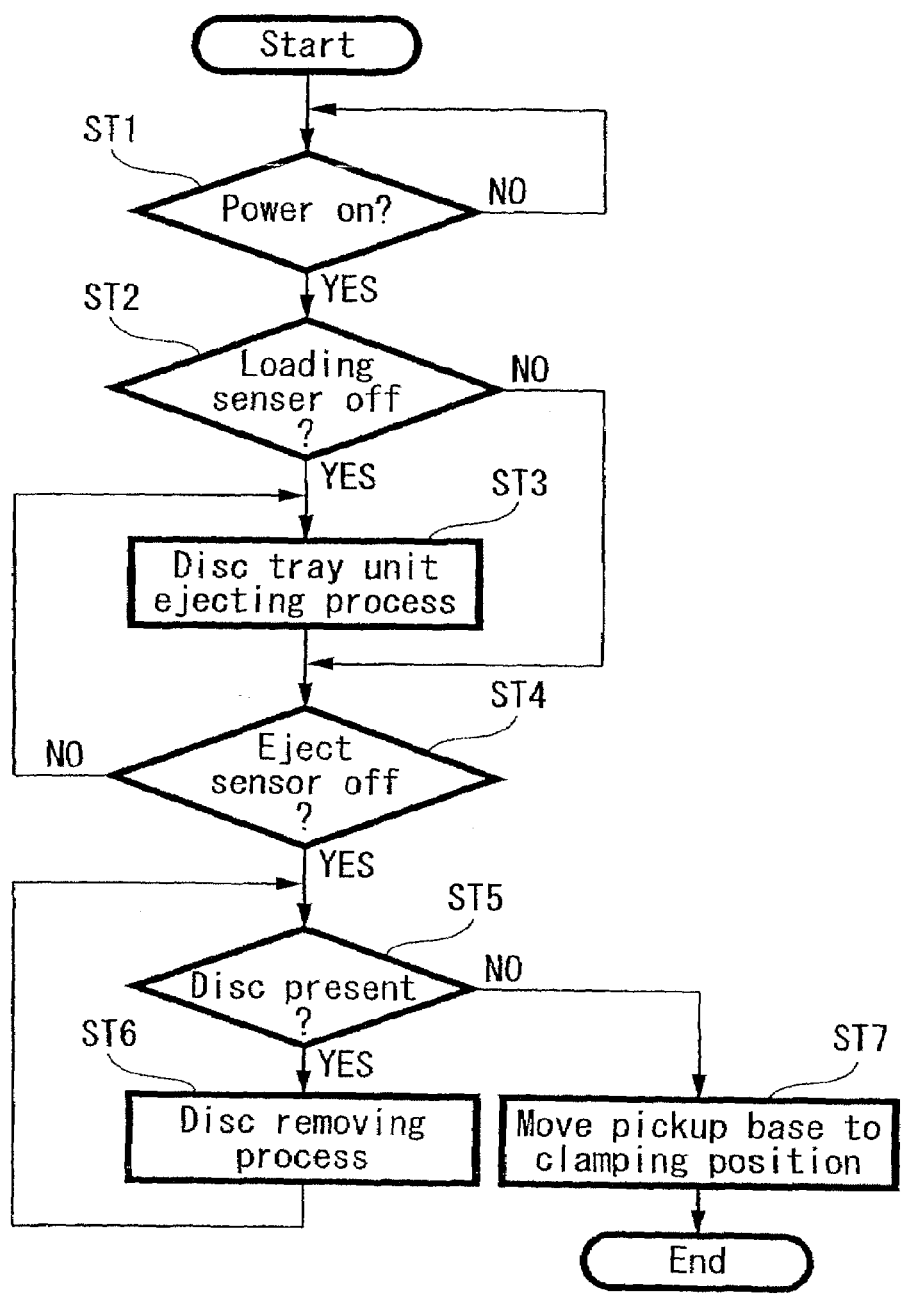
FIG. 11 is a control flowchart useful in explaining a process of an initialization operation of the disc tray unit.

FIG. 11 is a control flowchart showing an initialization operation of the disc tray unit 50.

In step 1 (ST1), it is monitored whether the power supply of the label printing apparatus 1 has been turned on, and if it has been confirmed that the label printing apparatus 1 has been turned on, it is then confirmed whether the loading sensor 41 is off (ST2). If it has been confirmed in step 2 that the loading sensor 41 is off, it is determined whether the disc tray unit 50 is at the position (hereinafter called the "loading position") at which printing information can be printed on the label surface of the optical disc and an ejecting process is carried out for the disc tray unit (ST3). In step 3, the drive motor 86 of the information recording/reproducing unit 70 is driven to slide the slide plate 78 and lower the pickup base 71 so that the supporting means made up of the turntable 82 and the disc clamper 83 are moved to a non-clamping position where the clamping (supporting) of the disc is removed, and the disc tray unit 50 is moved to a position (hereinafter called the "eject position") at which the optical disc can be changed. When it has been confirmed that the eject sensor 40 is off and the disc tray unit 50 has moved to the eject position (ST4), it is then confirmed whether an optical disc is present on the disc mounting part 57 (ST5), and when an optical disc is present, a process that removes the optical disc from the disc mounting part 57 is carried out (ST6). When it has been confirmed that there is no optical disc in step 5, or that the optical disc has been removed in step 6, the drive motor 86 of the information recording/reproducing unit 70 is driven to slide the slide plate 78 and so raise the pickup base 71, thereby moving the supporting means made up of the turntable 82 and the disc clamper 83 to the clamping position where an optical disc is clamped (supported).

On the other hand, when it has been confirmed in step 2 that the loading sensor 41 is not off, it is determined whether the eject sensor 40 is off, and when the eject sensor 40 is off, it is recognized that the disc tray unit 50 is already at the eject position so that the processes from step 5 onwards are carried out. When the eject sensor 40 is not off, it is determined that the disc tray unit 50 has stopped midway or is displaced from the correct position and so a process that moves the disc tray unit to the eject position is carried out.

Next, the core process will be described.

Figure 12:
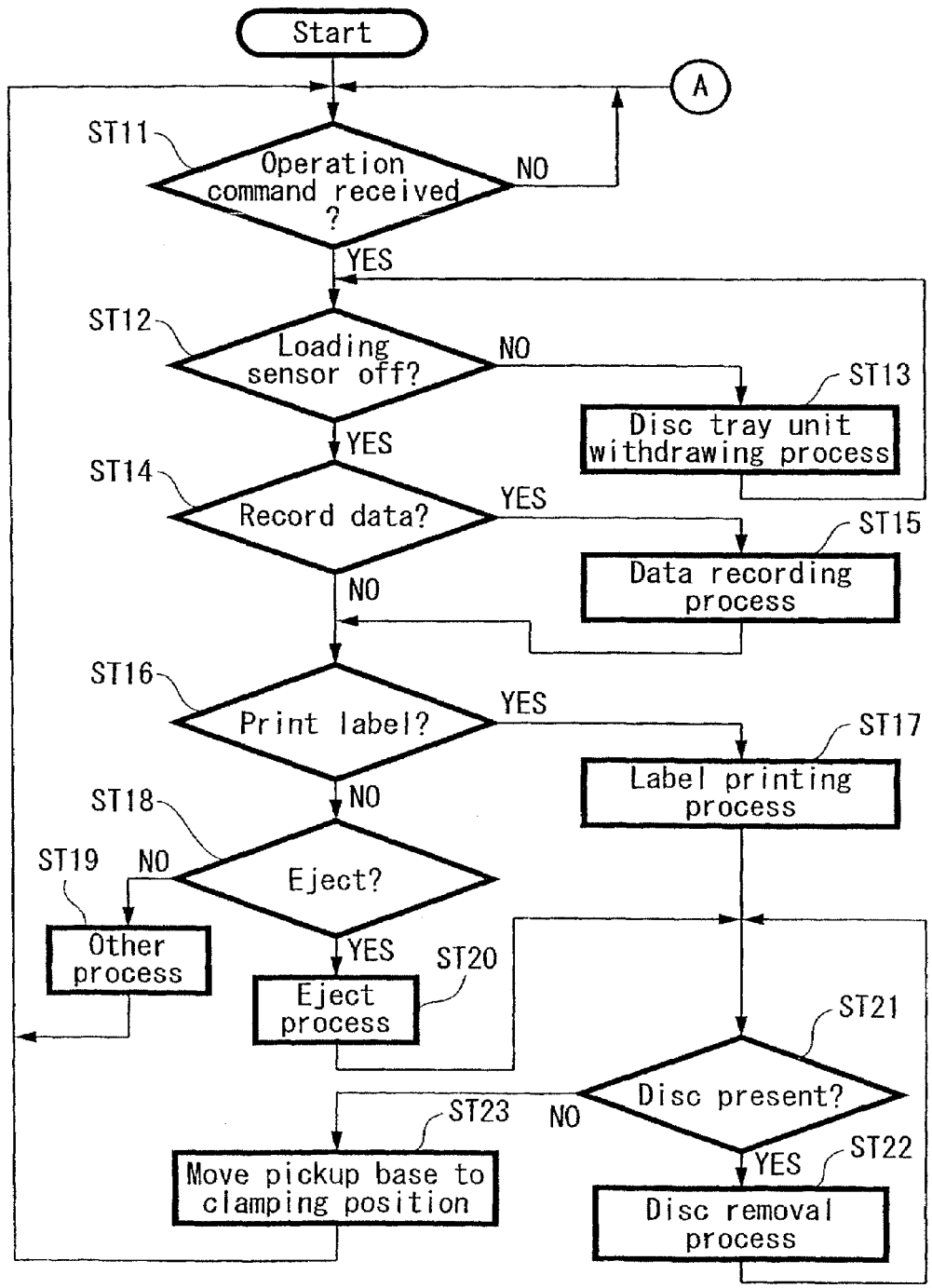
FIG. 12 is a control flowchart useful in explaining a core process operation of the disc tray unit.

As shown in FIG. 12, first it is confirmed whether there is an operation command (ST11). When an operation command is received in step 11, it is confirmed whether the loading sensor 41 is off (ST12). When the loading sensor 41 is not off, a withdrawing process that moves the disc tray unit 50 to the loading position is carried out (ST13). When the loading sensor 41 is off in step 12, the type of operation command is determined. When the operation command is a data recording command (ST14), a data recording process is carried out (ST15). When the operation command is a label printing command (ST16), a label printing process is carried out (ST17). When the operation command is an eject command (ST18), an eject process is carried out (ST20). When it is determined in step 18 that the operation command is not an eject command, a reproducing process for an optical disc, or another process such as a reset process is carried out (ST19). When a label printing process has been carried out in step 17, or when the eject process has been carried out in step 20, the pickup base 71 is lowered so that the supporting means made up of the turntable 82 and the disc clamper 83 is moved to the non-clamping position, so that it is confirmed whether an optical disc is present on the disc mounting part 57 (ST21), and when an optical disc is present, a removal process for the optical disc which is required to change optical discs is carried out (ST22). When it has been confirmed in step 21 and step 22 that the optical disc has been removed from the disc mounting part 57, the pickup base 71 is raised, and the supporting means made up of the turntable 82 and the disc clamper 83 is moved to the clamping position.

Next, the disc tray unit withdrawing process (ST13) in the core process shown in FIG. 12 will be described in detail.

Figure 13:
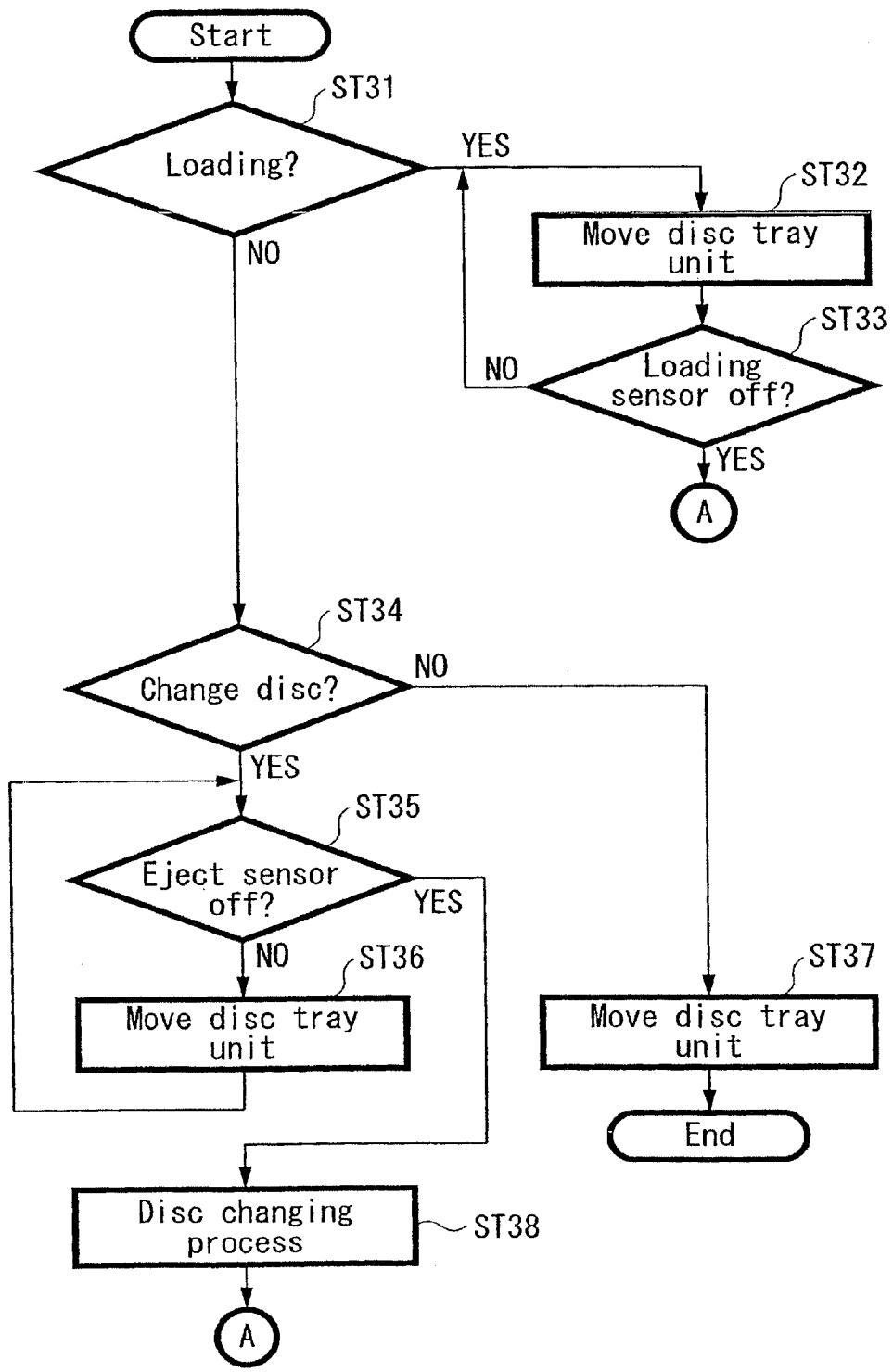
FIG. 13 is a control flowchart useful in explaining a withdrawing process in the core process operation.

If it is confirmed that the loading sensor 41 is not off in step 12 in the core process shown in FIG. 12, it is confirmed in step 31 of the disc tray unit withdrawing process shown in FIG. 13 whether the operation command is a loading command. When the operation command is a loading command, the disc tray unit 50 is moved to the loading position (ST32) and the process ends when it has been confirmed that the loading sensor 41 is off (ST33), with the control flow then returning to step 11 of the core process shown in FIG. 12.

On the other hand, when it has been confirmed in step 31 that the operation command is not a loading command, it is confirmed whether the operation command is an optical disc changing command (ST34), and when it has been confirmed that the operation command is not an optical disc changing command, it is determined that the command is a loading command that accompanies other commands, the process ends when the disc tray unit 50 has been moved to the loading position (ST37), and the control flow returns to step 12 in the core process shown in FIG. 12. If it has been confirmed in step 34 that the command is an optical disc changing command, it is confirmed that the eject sensor 40 is off (ST35), a changing process for optical discs is carried out (ST38), and the control flow returns to step 11 of the core process shown in FIG. 12. If it has been confirmed in step 35 that the eject sensor 40 is not off, the disc tray unit is moved to the eject position (ST36), and the optical disc changing process is carried out when it has been confirmed that the eject sensor 40 is off (ST38).

Next, the data recording process (ST15) in the core process shown in FIG. 12 will be described in detail.

Figure 14:
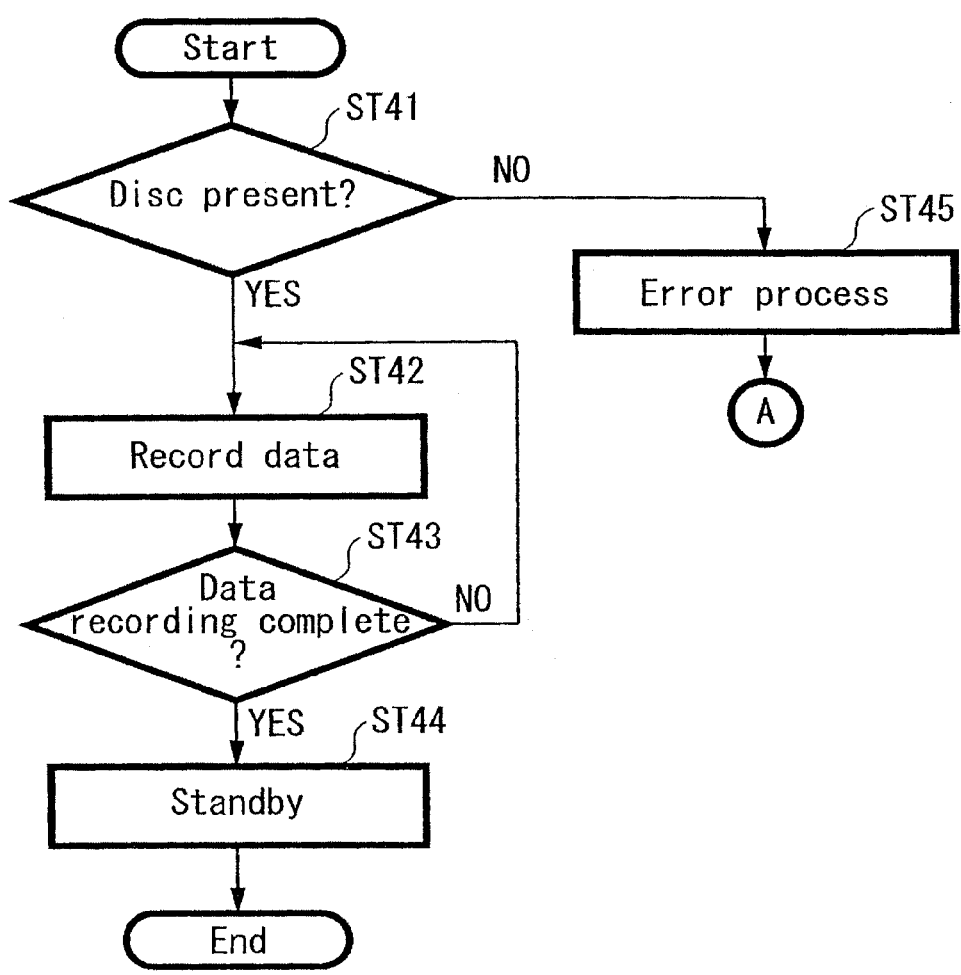
FIG. 14 is a control flowchart useful in explaining a data recording process in the core process operation.

When it has been confirmed in step 14 in the core process shown in FIG. 12 that the operation command is a data recording command, in step 41 of the data recording process shown in FIG. 14 it is confirmed whether an optical disc is present on the disc mounting part 57. When it cannot be confirmed that an optical disc is present on the disc mounting part 57, it is determined that the data recording process cannot be executed and an error process, such as the displaying of a warning message or the emission of a warning sound, is carried out (ST45), and the control flow returns to the core process shown in FIG. 12.

On the other hand, when it has been confirmed in step 41 that an optical disc is present on the disc mounting part 57, the recording of data sent from a host computer (not shown) is carried out (ST42). When a command or flag showing the end of data recording has been confirmed in step 43, the apparatus is temporarily placed on standby (ST44), before the control flow returns to step 16 in the core process shown in FIG. 12 and a following operation command is confirmed.

Next, the label printing process (ST17) in the core process shown in FIG. 12 will be described in detail.

When it has been confirmed in step 16 in the core process shown in FIG. 12 that the operation command is a label printing command, the turntable 82 and the disc clamper 83 are withdrawn to the non-clamping position by moving the pickup base 71 to the non-clamping position (ST51), and it is confirmed whether an optical disc is present on the disc mounting part 57 (ST52). When it cannot be confirmed whether an optical disc is present on the disc mounting part 57, it is determined that the label printing process cannot be carried out, an error process, such as the displaying of a warning message or the emission of a warning sound, is carried out (ST53), and the control flow returns to step 11 in the core process shown in FIG. 12.

On the other hand, when it has been confirmed in step 52 that an optical disc is present on the disc mounting part 57, it is confirmed whether the loading sensor 41 is off (ST54). When it cannot be confirmed that the loading sensor 41 is off, it is determined that the disc tray unit 50 has been displaced, and a positioning process that moves the disc tray unit 50 in the loading direction or the eject direction to position the disc tray unit 50 at a position where the loading sensor 41 becomes off is carried out (ST55). If it has been confirmed in step 54 that the loading sensor 41 is off, the heat roller 19 of the label printer main body is lowered and the thermal transfer film ribbon (transfer sheet) 9 is pressed onto the label surface of the optical disc on the disc tray unit 50 (ST56). The disc tray unit 50 is moved in the eject direction with the thermal transfer film ribbon 9 in a pressed state (ST57) to transfer (print) the printing information formed on the thermal transfer film ribbon 9 onto the label surface of the optical disc using the heat roller 19 (ST58). When it has been confirmed during a printing operation that the eject sensor 40 is off, it is determined that the disc tray unit 50 has moved to the eject position, that is, the printing of the printing information on the label surface of the optical disc is complete (ST59), and the movement of the disc tray unit 50 is stopped (ST60). After this, the heat roller 19 is raised and the thermal transfer film ribbon 9 is separated from the surface of the disc tray unit 50 (ST61). After printing on the label surface of the optical disc has been completed, the disc tray unit 50 will have moved to the eject position, so that the apparatus enters a standby state (ST62) and the control flow proceeds to step 21 in the core process shown in FIG. 12 and the apparatus waits for the optical disc to be removed from the disc mounting part 57 of the disc tray unit 50.

It should be noted that when a reproduction function for optical discs is incorporated in the label printing apparatus, if it has been confirmed in the core process shown in FIG. 12 that the operation command is a command relating to data reproduction, in step 19 the data reproducing process shown in FIG. 16 is carried out.

In the data reproducing process shown in FIG. 16, it is confirmed whether an optical disc is present on the disc mounting part 57 (ST81). When the presence of an optical disc on the disc mounting part 57 cannot be confirmed, it is determined that the data reproducing process cannot be executed, an error process, such as the displaying of a warning message or the emission of a warning sound, is carried out (ST82), and the control flow returns to step 11 in the core process shown in FIG. 12.

On the other hand, when the presence of an optical disc on the disc mounting part 57 has been confirmed in step 81, it is confirmed whether the optical disc is already being reproduced (ST83), and if it is confirmed that the optical disc is not being reproduced, the reproduction of data is started (ST84). When it is confirmed in step 83 that the optical disc is being reproduced, it is confirmed whether the operation command is an option command relating to a reproducing process, such as high-speed reproduction, reverse reproduction, skipping or the like, and if the operation command is confirmed as an option command, the control flow proceeds to step 84 where a reproducing process is carried out in accordance with the command. Also, if it has been confirmed that the operation command is not an option command, it is confirmed whether the command indicates a stopping or ending of data reproduction (ST86), and when it has been confirmed that the operation command is a command indicating a stopping or ending of data reproduction, the data reproducing process ends and the control flow returns to step 11 in the core process shown in FIG. 12. It should be noted that when the control flow has entered the data reproducing process, since loop control is carried out for the process from step 83 to step 87 until a command relating to the stopping or ending of data reproduction is received, a standby state for receiving an operation command is entered in step 87.

Control of a disc tray unit of a so-called "auto-changer-type" label printing apparatus in which the changing of optical discs is automated has been described above, but the present invention can also be applied to a label printing apparatus that does not have an auto-changer function, and therefore control of a disc tray unit in a so-called "single-type" label printing apparatus that does not have an auto-changer function will now be described.

FIG. 17 is a control flowchart showing an initialization operation of the disc tray unit 50. In a single-type label printing apparatus, the disc tray unit 50 fundamentally stands by in a withdrawn state at the loading position, so that the initialization operation greatly differs to an auto changer-type label printing apparatus.

In step 61 (ST61), it is monitored whether the power supply of the label printing apparatus 1 has been turned on, and when it is confirmed that the power supply of the label printing apparatus 1 has been turned on, it is confirmed whether the eject sensor 40 is off (ST62). When it has been confirmed in step 62 that the eject sensor 40 is off, it is determined that the disc tray unit 50 is at the eject position and a process that withdraws the disc tray unit 50 is carried out (ST63). At this time, the pickup base 71 is not moved. When it has been confirmed that the loading sensor 41 is off showing that the disc tray unit 50 has moved to the loading position (ST64), it is confirmed whether an optical disc is present on the disc mounting part 57 (ST65) and when an optical disc is present, the position of the pickup base 71 is confirmed (ST66). When it has been confirmed that the pickup base 71 is at the non-clamping position, it is determined that the optical disc on the disc mounting part 57 is an optical disc on which data has just been recorded and/or printing information has just been printed, and a confirmation indication is given to the user, such as by displaying a warning message and by emitting a warning sound (ST67). When it has been confirmed that no optical disc is present on the disc mounting part 57 in step 65 or that the pickup base 71 is at the clamping position in step 66, the initialization operation is complete.

On the other hand, when it has been confirmed in step 62 that the eject sensor 40 is not off, it is confirmed whether the loading sensor 41 is off, and when the loading sensor 41 is off, it is recognized that the disc tray unit 50 is already at the loading position, and the processes from step 65 onwards are carried out. When the loading sensor 41 is not off, it is determined that the disc tray unit 50 has stopped midway or is displaced, and therefore a process that moves the disc tray unit 50 to the loading position is carried out.

Next, the core process will be described.

The core process of the single-type label printing apparatus shown in FIG. 18 is substantially the same as the core process of the auto changer-type label printing apparatus shown in FIG. 12. The control flowchart of the core process shown in FIG. 18 differs from the control flowchart of the core process shown in FIG. 12 only in omitting the disc removal process of step 22. A single-type label printing apparatus does not have an auto changer function, so that the changing of optical discs is manually carried out by users. For this reason, the control block of step 22 is not present. Aside from the omission of this control block, the control flowchart of the core process shown in FIG. 18 is identical to the control flowchart of the core process shown in FIG. 12, so that the other control blocks have been assigned the same step numbers and description thereof has been omitted.

The disc tray unit withdrawing process (ST13) in the core process shown in FIG. 18 will be described next.

When it has been confirmed in step 12 of the core process shown in FIG. 18 that the loading sensor 41 is not off, it is confirmed in step 71 of the disc tray unit withdrawing process shown in FIG. 19 whether the operation command is a loading command. When the operation command is a loading command, the disc tray unit 50 is moved to the loading position (ST72) and the process is complete when it has been confirmed that the loading sensor 41 is off (ST73), with the control flow then returning to step 11 in the core process shown in FIG. 18.

On the other hand, when it has been confirmed in step 71 that the operation command is not a loading command, it is determined that the operation command is a loading command that accompanies another command and the process is complete when the disc tray unit 50 has moved to the loading position, with the control flow then returning to step 12 in the core process shown in FIG. 18.

As the data recording process (ST15) in the core process shown in FIG. 18 is the same as the data recording process shown in FIG. 14, detailed description thereof has been omitted.

Figure 15:
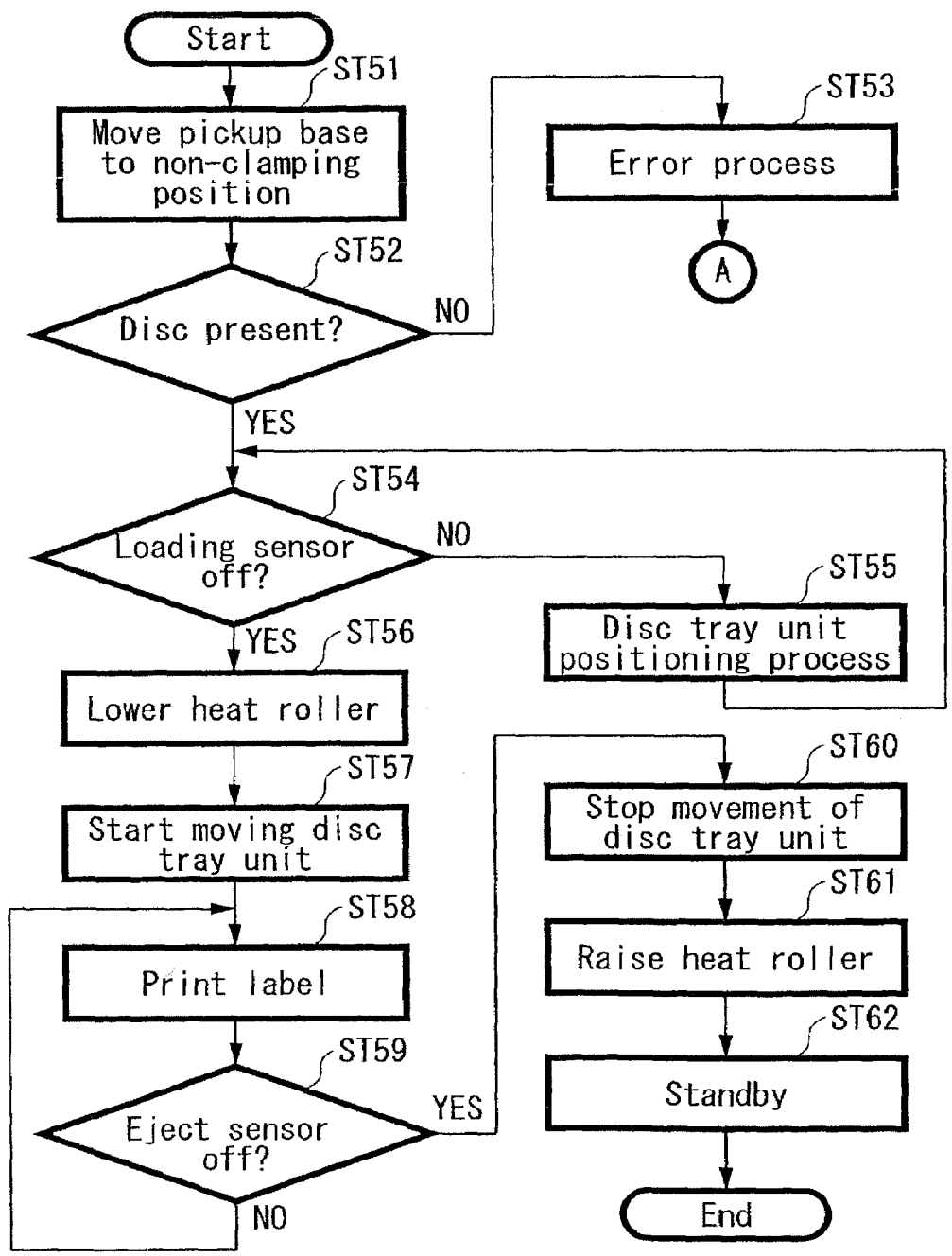
FIG. 15 is a control flowchart useful in explaining a label printing process in the core process operation.

Also, as the label printing process (ST17) in the core process shown in FIG. 18 is the same as the label printing process shown in FIG. 15, detailed description thereof has been omitted.

It should be noted that a function for reproducing optical discs is incorporated in the label printing apparatus and when it has been confirmed that the operation command is a command relating to data reproduction, in step 19 the data reproducing process shown in FIG. 16 is carried out.

As should be clear from the above description, according to the present invention, an information recording/reproduction means for recording or reproducing information on a recording surface of an optical disc is incorporated in a disc tray unit, and the operation control of the disc tray unit in which the information recording/reproduction means is incorporated is modified so that it is possible to integrate a thermal transfer-type label printer and an optical disc apparatus and a recording process or a reproducing process for information on the recording surface of an optical disc and a printing process for printing information on the label surface of an optical disc can be automatically carried out by a series of operations.

In addition, since the same functions as an optical disc apparatus that records or reproduces information on a recording surface of an optical disc can be integrated into a thermal transfer-type label printing apparatus, it is possible to miniaturize a multi-function label printing apparatus.

It should be noted that the present invention is not limited to the above embodiments, and can be modified in a variety of ways without departing from the scope of the invention disclosed in the claims.

Figure 20:
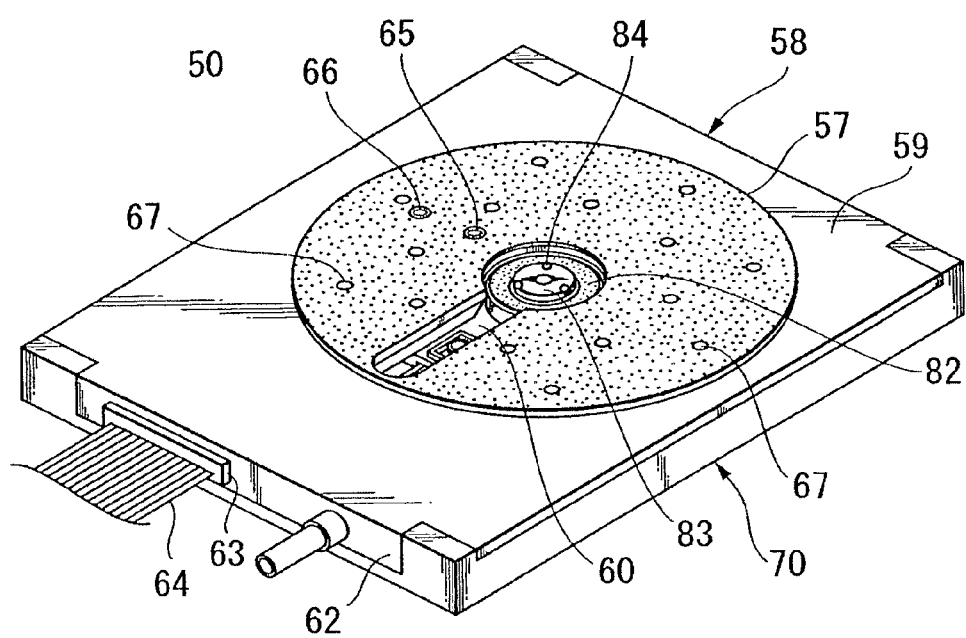
FIG. 20 is an external view showing the principal parts of the disc tray unit in another embodiment of the present invention.

As one example, although a grip sheet 61 is stuck onto the surface of the disc mounting part 57 as a means for statically holding an optical disc on the disc tray unit 50, as shown in FIG. 20, a plurality of suction holes 67 may be provided in the disc mounting part 57 and by sucking using a vacuum mechanism (not shown) connected via a suction pipe 68, the optical disc mounted on the disc mounting part 57 may be attached via suction using the suction holes 67. It should be noted that the vacuum mechanism should preferably be provided inside the same housing as the label printer. Also, a grip sheet and a vacuum mechanism may be used together.

Also, in the above embodiment, although photointerruptors are used as the means for confirming whether an optical disc is present on the disc mounting part 57, a laser beam may be emitted from the head unit 81 and the presence of reflected light may be detected. In the case where the pickup base 71 is cantilevered, when the pickup base 71 is at the non-clamping position, the head unit 81 is inclined at a predetermined angle to the optical disc, so that it is necessary to dispose a light receiving element for detecting the presence of an optical disc at a position that takes a direction of reflection of a light beam into account.

It is also possible to provide a detecting means for detecting a movement position of the pickup base 71 and to determine the state of the optical disc on the disc tray using position information on the disc tray unit 50 and position information on the pickup base 71. In the above embodiment, when printing information is printed on the label surface of an optical disc or when the disc tray unit 50 moves from the loading position to the eject position, the pickup base 71 will definitely move to the non-clamping position, and when the disc tray unit 50 is at the eject position, the pickup base 71 is prevented from moving to the clamping position while an optical disc is present on the disc mounting part 57, so that if the relationship between the position information on the disc tray unit 50, the position information on the pickup base 71, and the respective command processes is standardized, it will be possible to determine the state.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A label printing apparatus that presses a transfer sheet on which printed information has been formed onto a label surface of an optical disc mounted on a disc tray to transfer the printed information onto the label surface,
    the label printing apparatus comprising, in the disc tray, information recording/reproduction means for recording or reproducing information on a recording surface of the optical disc,
    wherein the information recording/reproduction means comprises: optical head means for recording or reproducing information by emitting a light beam onto the recording surface of the optical disc; supporting means for rotatably supporting the optical disc; and rotating means for rotating the optical disc at a predetermined speed, wherein when the printing information is printed on the label surface of the optical disc, a supporting of the optical disc by the supporting means is released.

2. A label printing apparatus according to claim 1, further comprising holding means that statically holds the optical disc on the disc tray, wherein the optical disc is held by the holding means when the supporting of the optical disc by the supporting means has been released.

3. A label printing apparatus according to either claim 1 or claim 2, wherein the supporting means is movable between a supporting position where the supporting means rotatably supports the optical disc and a non-supporting position where the supporting of the optical disc is released, and the supporting means is moved to the non-supporting position when the disk tray is moved from a position where the printing information can be printed on the label surface of the optical disc to a position where the optical disc can be changed.

4. A label printing apparatus according to claim 3, wherein when the disc tray is at the position where the optical disc can be changed and it has been confirmed that an optical disc is not mounted on the disc tray, the supporting means moves from the non-supporting position to the supporting position.

* * * * *